US012576635B2

(12) United States Patent
Yamada

(10) Patent No.: US 12,576,635 B2
(45) Date of Patent: Mar. 17, 2026

(54) HEAD UNIT, LIQUID EJECTION DEVICE, AND CONTROL METHOD

(71) Applicant: SEIKO EPSON CORPORATION, Tokyo (JP)

(72) Inventor: Shinichi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 18/407,504

(22) Filed: Jan. 9, 2024

(65) Prior Publication Data

US 2024/0239098 A1 Jul. 18, 2024

(30) Foreign Application Priority Data

Jan. 11, 2023 (JP) ................................ 2023-002237

(51) Int. Cl.
*B41J 2/045* (2006.01)

(52) U.S. Cl.
CPC ......... *B41J 2/0455* (2013.01); *B41J 2/04573* (2013.01); *B41J 2/04581* (2013.01)

(58) Field of Classification Search
CPC ................ B41J 2/04581; B41J 2/04541; B41J 2/04573; B41J 2/14233; B41J 2/04555; B41J 2/04551; B41J 2/04553; B41J 2/07; B41J 2/14274; B41J 2/15; B41J 29/38; B41J 29/393; B41J 2002/14483; B41J 2002/14354; B41J 2002/14362
See application file for complete search history.

(56) References Cited

U.S. PATENT DOCUMENTS 7,232,199 B2 * 6/2007 Shinkawa ............. B41J 2/0451
347/19
2015/0091960 A1 4/2015 Nakazawa et al.

FOREIGN PATENT DOCUMENTS

JP 6323585 B2 5/2018

* cited by examiner

*Primary Examiner* — Thinh H Nguyen
(74) *Attorney, Agent, or Firm* — Spencer Fane LLP

(57) ABSTRACT

A head unit includes an ejection section that ejects a liquid by a piezoelectric device displaced, a residual vibration detector that detects a residual vibration signal, a first switch that switches whether or not to feed a first drive signal, a second switch that switches whether or not to feed the residual vibration signal, and a controller that controls the first switch and the second switch. The controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

7 Claims, 14 Drawing Sheets

FIG. 10

3011

| TIMING | | AFTER LAT RISING | FIRST PULSE OF TSIG | | SECOND PULSE OF TSIG | |
|---|---|---|---|---|---|---|
| PULSE EDGE | | – | RISING | FALLING | RISING | FALLING |
| STATE | | ST1 | ST2 | ST3 | ST4 | ST5 |
| OPERATION | NVTS TERMINAL OUTPUT | Hiz | Hiz | DETECTION STATE | Hiz | Hiz |
| | DRIVE SWITCH | ON | ON | OFF | ON | ON |
| | DETECTION NOZZLE SELECTION SWITCH | OFF | ON | ON | ON | OFF |
| | BIAS SWITCH | OFF | ON | ON | ON | OFF |
| | DETECTION SWITCH | ON | ON | OFF | ON | ON |
| DETECTION STATE | | BEFORE DETECTION | DETECTION RESISTOR SHORT-CUT | DETECTION | DETECTION RESISTOR SHORT-CUT | AFTER DETECTION |

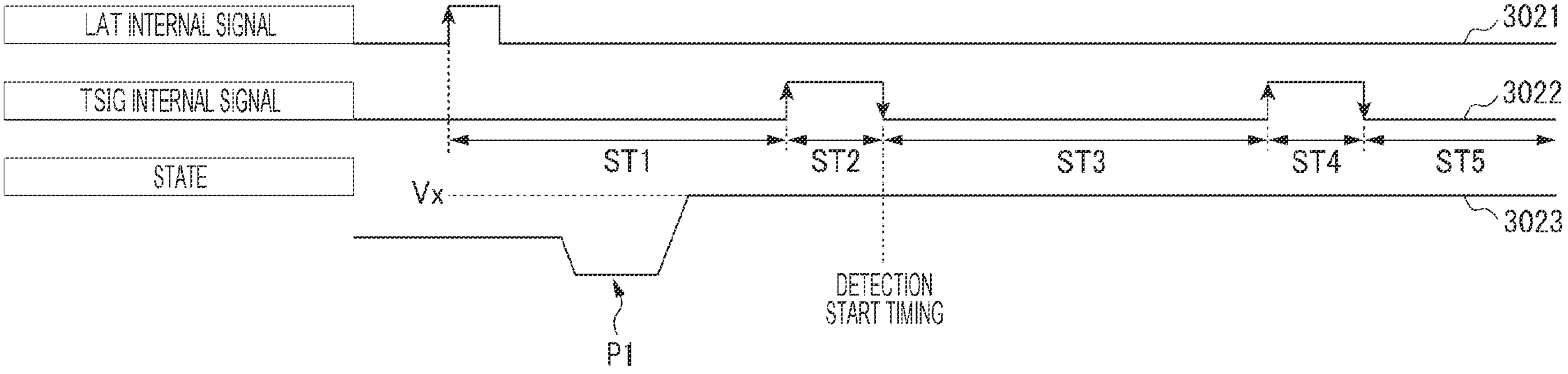

HEAD UNIT, LIQUID EJECTION DEVICE, AND CONTROL METHOD

The present application is based on, and claims priority from JP Application Serial Number 2023-002237, filed Jan. 11, 2023, the disclosure of which is hereby incorporated by reference herein in its entirety.

BACKGROUND

1. Technical Field

The present disclosure relates to a head unit, a liquid ejection device, and a control method.

2. Related Art

For example, in an ink jet printer, an image is printed on a medium by ejecting ink in a cavity onto the medium. In such a printer, information on a state of ink in a nozzle from residual vibration of the ink in the nozzle can be acquired by using a piezoelectric device.

Japanese Patent No. 6323585 describes that an ejection state is determined by applying vibration to ink in a cavity by using a piezoelectric device and detecting a behavior of the ink for residual vibration. In addition, Japanese Patent No. 6323585 describes a circuit or the like that applies a drive signal to a piezoelectric device in a step of applying vibration to the ink and detects a change in electromotive force of the piezoelectric device in a step of inspecting the residual vibration of the ink (see Japanese Patent No. 6323585).

However, in the technique of the related art, a timing at which switching between the step of applying the vibration to the ink and the step of detecting the residual vibration of the ink is performed by a switch is not sufficiently examined, detection accuracy of the residual vibration deteriorates, and the accuracy may further deteriorate when determination or the like based on the detection result of the residual vibration is performed.

SUMMARY

In order to solve the problem, according to an aspect of the present disclosure, there is provided a head unit including an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch. The controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

In order to solve the problem, according to another aspect of the present disclosure, there is provided a liquid ejection device including a transport mechanism, and a head unit. The head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch, the controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

In order to solve the problem, according to still another aspect of the present disclosure, there is provided a control method in a head unit. The head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch. In the control method, the controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

BRIEF DESCRIPTION OF THE DRAWINGS

FIG. 10 is a diagram illustrating an example of control contents according to the embodiment.

DESCRIPTION OF EMBODIMENTS

Hereinafter, embodiments will be described with reference to the drawings.

Hereinafter, embodiments of a liquid ejection device of the present disclosure will be described in detail. The present embodiment is given as an example, and contents of the present disclosure are not to be interpreted in a limitative manner. Hereinafter, in the present embodiment, an ink jet printer that ejects ink to print an image on a recording sheet will be described as an example of the liquid ejection device. The ink is an example of a liquid material. The recording sheet is an example of a droplet receiving material.

Figure 1:
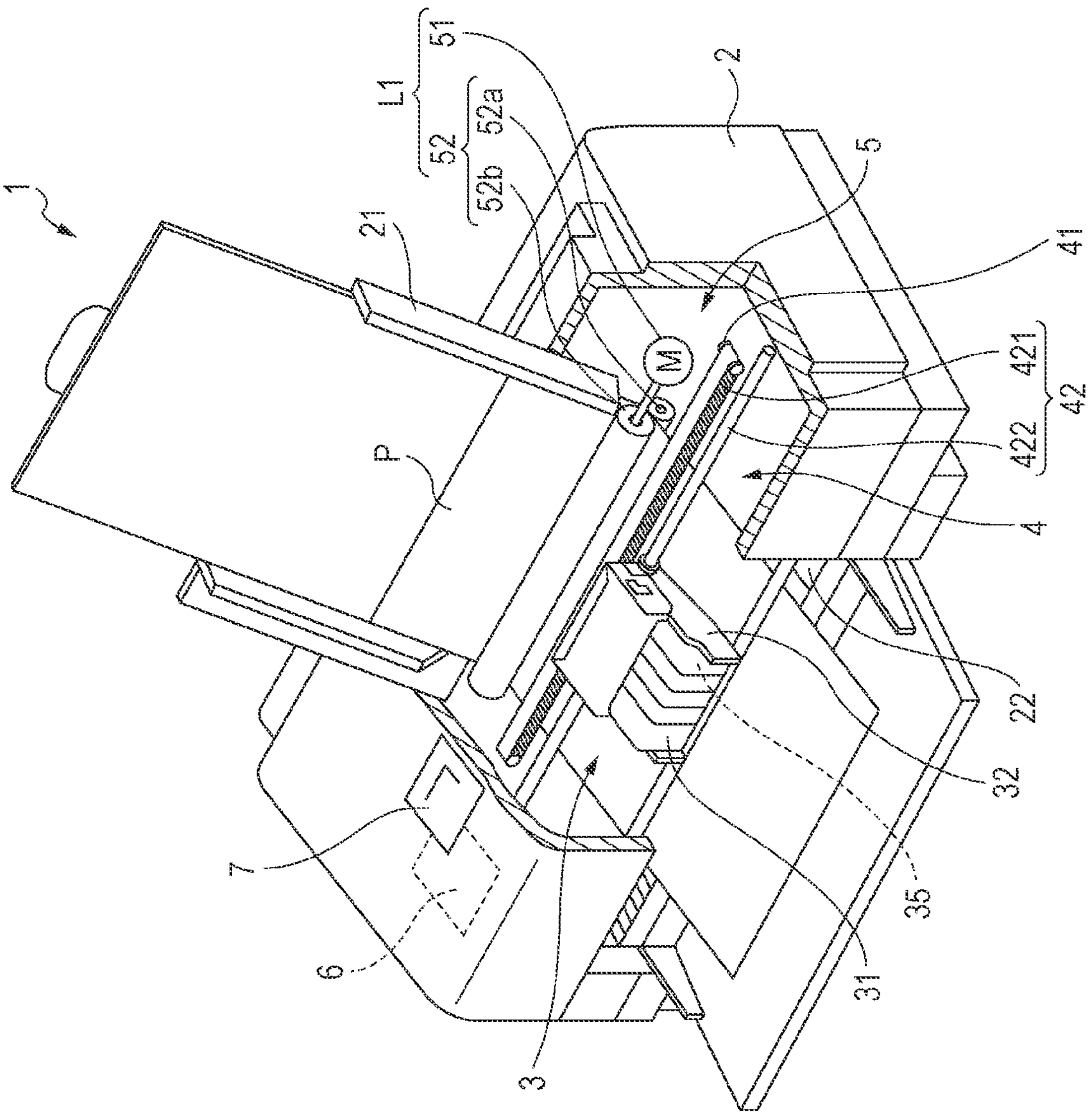
FIG. 1 is a schematic diagram illustrating a configuration of an ink jet printer which is a type of liquid ejection device according to an embodiment.

FIG. 1 is a schematic diagram illustrating a configuration of an ink jet printer 1 which is a type of the liquid ejection device according to an embodiment. Note that, in the following description, in FIG. 1, an upper side is referred to as an upper portion and a lower side is referred to as a lower portion. First, the configuration of an ink jet printer 1 will be described. The ink jet printer 1 illustrated in FIG. 1 includes a device body 2. A tray 21 in which recording sheets P are installed is provided at an upper rear part, a sheet discharge opening 22 for discharging the recording sheets P are provided at a lower front part, and an operation panel 7 is provided at an upper surface.

The operation panel 7 is, for example, a liquid crystal display, an organic electroluminescence (EL) display, a light emitting diode (LED) lamp, and the like, and includes a display section (not illustrated) that displays an error message or the like, and an operation section (not illustrated) that includes various switches and the like. The display section of the operation panel 7 functions as a notification unit. In addition, the device body 2 mainly has, therein, a printing device 4 including a printing section 3 that is a reciprocating moving object, a sheet feeding device 5 that feeds and discharges the recording sheets P to and from the printing device 4, and a controller 6 that controls the printing device 4 and the sheet feeding device 5.

Under the control of the controller 6, the sheet feeding device 5 intermittently feeds the recording sheets P one by one. The recording sheet P passes through the vicinity of a lower portion of the printing section 3. At this time, the printing section 3 reciprocates in a direction substantially orthogonal to a feeding direction of the recording sheet P, and printing for the recording sheet P is performed. That is, the reciprocating of the printing section 3 and the intermittent feeding of the recording sheets P are main scanning and sub-scanning in the printing, and ink jet printing is performed.

The printing device 4 includes the printing section 3, a carriage motor 41 serving as a drive source for moving the printing section 3 to reciprocate in a main scanning direction, and a reciprocating mechanism 42 that causes the printing section 3 to reciprocate by receiving rotation of the carriage motor 41. The printing section 3 includes a plurality of head units 35, an ink cartridge (I/C) 31 that feeds ink to each head unit 35, and a carriage 32 at which each head unit 35 and the ink cartridge 31 are mounted. Note that, when an ink jet printer that consumes a large amount of ink is used, the ink cartridge 31 may not be mounted at the carriage 32 but may be installed in another place. The ink cartridge 31 may be configured to communicate with the head unit 35 through a tube to feed ink, but is not illustrated.

Note that, a cartridge filled with four colors of ink of yellow, cyan, magenta, and black is used as the ink cartridge 31, and thus, full-color printing is enabled. In this case, the head units 35 corresponding to the colors are provided in the printing section 3. Here, although FIG. 1 illustrates four ink cartridges 31 corresponding to four colors of ink, the printing section 3 may further include ink cartridges 31 of other colors, for example, light cyan, light magenta, dark yellow, special color of ink, and the like.

Figure 2:
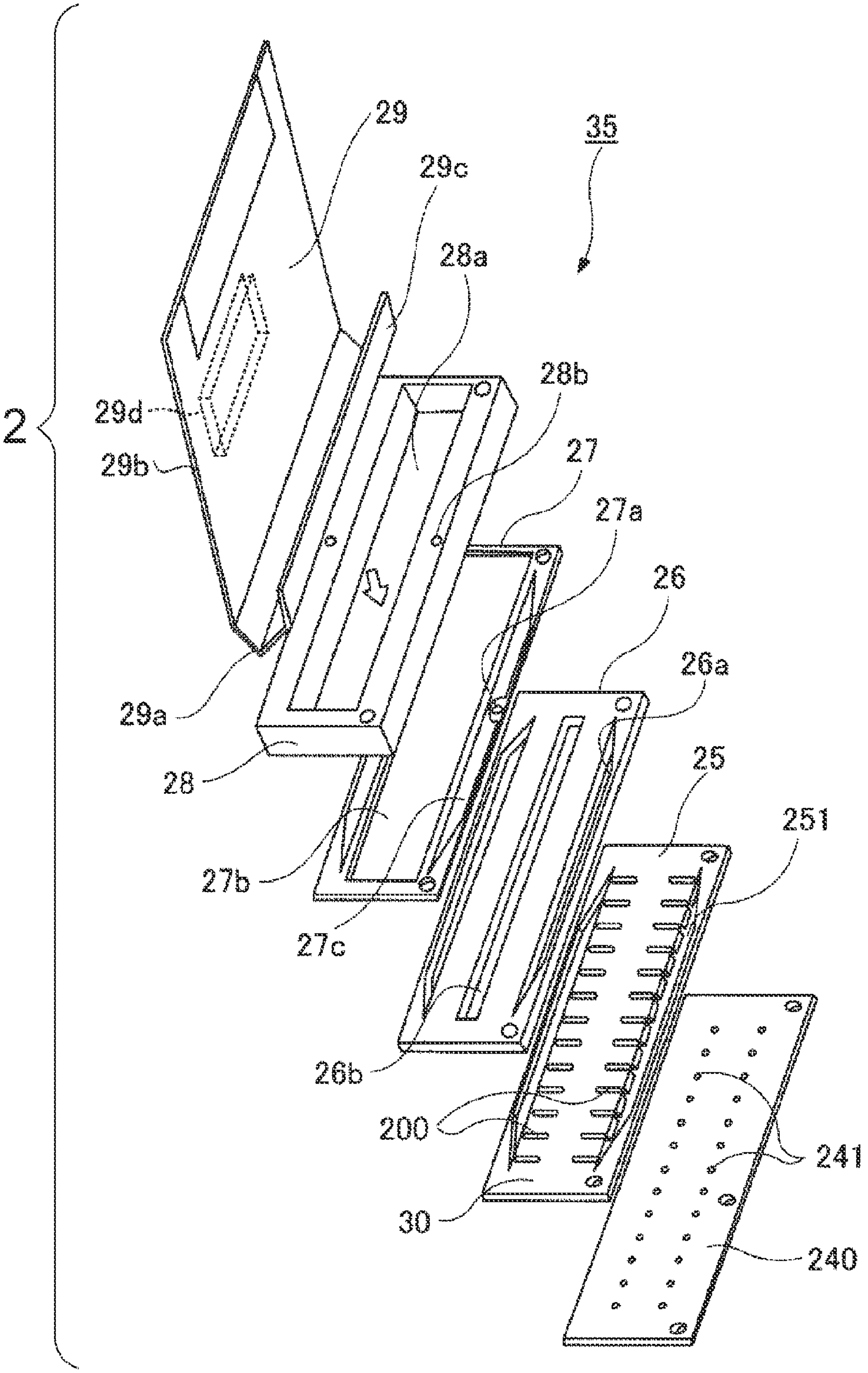
FIG. 2 is a schematic exploded perspective view illustrating a configuration example of a head unit in the ink jet printer illustrated in FIG. 1 according to the embodiment.

FIG. 2 is a schematic exploded perspective view illustrating a configuration of the head unit 35. As illustrated in FIG. 2, the head unit 35 according to the embodiment schematically includes a nozzle plate 240, a flow path substrate 25, a common liquid chamber substrate 26, a compliance substrate 27, and the like, and these members are attached to a unit case 28 in a state of being stacked.

The nozzle plate 240 is a plate-shaped member in which a plurality of nozzles 241 are provided in a row at a pitch corresponding to a dot formation density. For example, the nozzle row is formed by arranging 300 nozzles 241 in a row at a pitch corresponding to 300 dpi. In the embodiment, two nozzle rows are formed in the nozzle plate 240. Here, the two nozzle rows are formed to be deviated by half the pitch between the nozzles 241 in a direction in which the nozzles 241 are arranged. The nozzle plate 240 may be made of, for example, glass ceramics, a silicon single crystal substrate, stainless steel, or the like.

Figure 4:
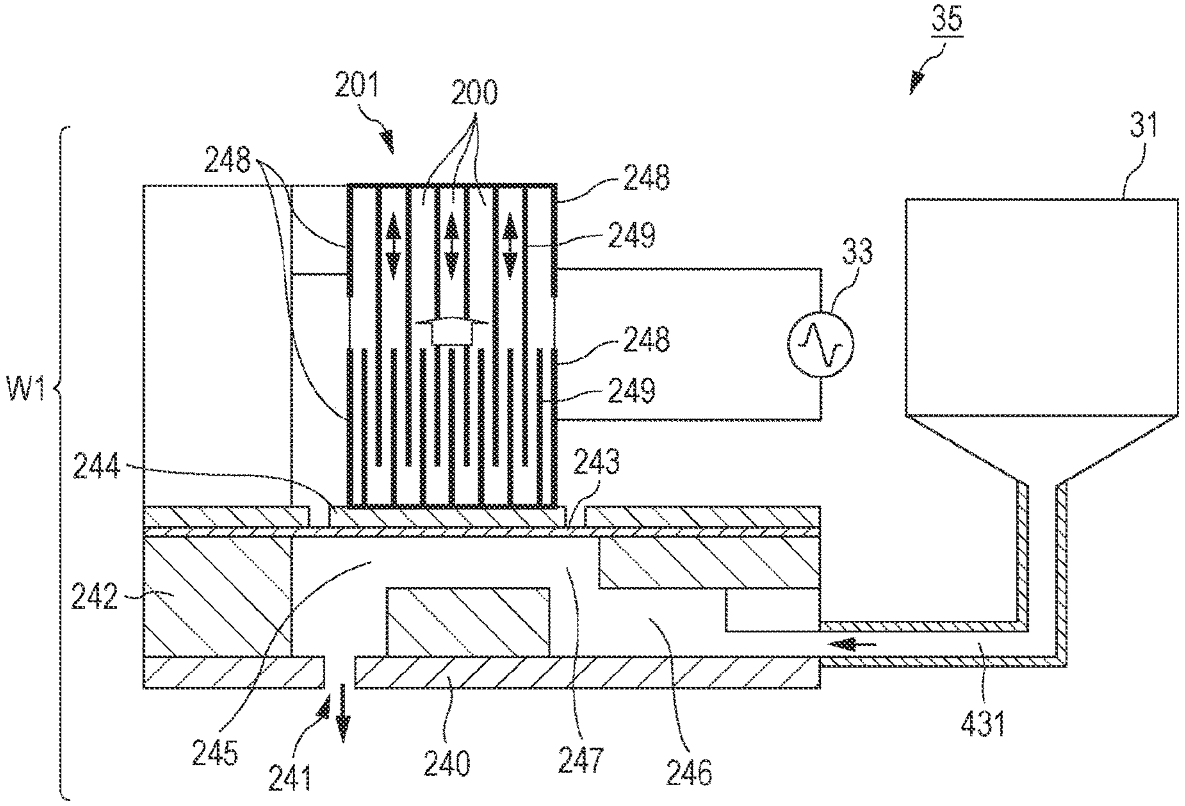
FIG. 4 is a schematic cross-sectional view illustrating an example of the head unit in the ink jet printer illustrated in FIG. 1 according to the embodiment.

An extremely thin elastic film 30 made of silicon dioxide is formed at a surface of the flow path substrate 25, which is an upper surface thereof and is on the common liquid chamber substrate 26 side, by thermal oxidation. A plurality of cavities 245 partitioned by a plurality of partition walls to correspond to the nozzles 241 by an anisotropic etching process are formed in the flow path substrate 25. The cavity 245 is illustrated in FIG. 4. Therefore, the cavities 245 are also formed in a row, and are deviated by half of the pitch between the nozzles 241 in the direction in which the nozzles 241 are arranged. A communication space portion 251 is formed outside the row of the cavities 245 in the flow path substrate 25. The communication space portion 251 communicates with the cavities 245.

In addition, a piezoelectric device 200 that deforms the elastic film 30 to pressurize the ink in the cavity 245 is formed for each cavity 245 in the flow path substrate 25.

The common liquid chamber substrate 26 having a through space portion **26*a* penetrating in a thickness direction is disposed at the flow path substrate 25 at which the piezoelectric devices 200 are formed. Examples of a material of the common liquid chamber substrate 26 include glass, ceramic material, metal, resin, and the like. For example, the common liquid chamber substrate 26 may be made of a material having substantially the same coefficient of thermal expansion as the flow path substrate 25. For example, the common liquid chamber substrate 26 may be formed by using a silicon single crystal substrate of the same material as the case where the flow path substrate 25** is a silicon single crystal substrate.

In addition, the through space portion 26*a* in the common liquid chamber substrate 26 communicates with the communication space portion 251 of the flow path substrate 25. In addition, in the common liquid chamber substrate 26, a wiring space portion 26*b* penetrating in a substrate thickness direction is formed between adjacent piezoelectric device rows. In addition, the compliance substrate 27 is disposed on an upper surface side of the common liquid chamber substrate 26. In a region of the compliance substrate 27 facing the through space portion 26*a* of the common liquid chamber substrate 26, an ink introduction port 27*a* for feeding ink from an ink introduction needle side to a common liquid chamber is formed by penetrating in a thickness direction. In addition, a region other than the ink introduction port 27*a* and a through-hole 27*b* in the region of the compliance substrate 27 facing the through space portion 26*a* is a flexible portion 27*c* that is formed to be extremely thin, and the common liquid chamber is formed to be partitioned by sealing an upper opening of the through space portion 26*a* by the flexible portion 27*c*. Then, the flexible portion 27*c* functions as a compliance portion that absorbs a pressure fluctuation of the ink in the common liquid chamber. Further, the through-hole 27*b* is formed at a central portion of the compliance substrate 27. The through-hole 27*b* communicates with a space portion 28*a* of the unit case 28.

The unit case 28 is a member that includes an ink introduction path 28*b* formed for feeding the ink introduced from the ink introduction needle side by communicating with the ink introduction port 27*a* to the common liquid chamber side and a recess that allows expansion of the flexible portion 27*c* in a region facing the flexible portion 27*c*. The space portion 28*a* penetrating in the thickness direction is provided at the central portion of the unit case 28, and one end side of a flexible cable 29 is inserted into the space portion 28*a* in an insertion direction indicated by a white arrow, is coupled to a terminal drawn out from the piezoelectric device 200, and is fixed by an adhesive. Examples of a material of the unit case 28 include a metal material such as stainless steel.

In the flexible cable 29, a control integrated circuit (IC) 29*d* for controlling the application of a drive voltage to the piezoelectric device 200 is implemented on one surface of a rectangular base film such as polyimide, and a pattern of an individual electrode wiring coupled to the control IC 29*d* is formed. In addition, coupling terminals (not illustrated) are provided in plurality of rows at one end portion of the flexible cable 29 to correspond to external electrodes 248 drawn out from the piezoelectric device 200, and other-end-side coupling terminals coupled to substrate terminal portions of a substrate that relay signals from the device body side of the ink jet printer 1 are provided in a plurality of rows at the other end portion. Then, in the flexible cable 29, a wiring pattern other than the coupling terminals at both end portions and a front surface of the control IC 29*d* are covered with a resist. The external electrodes 248 are illustrated in FIG. 4.

One end side 29*a* of the flexible cable 29 coupled to the external electrodes 248 and internal electrodes 249 is bent to protrude. More specifically, the flexible cable 29 is bent in a mountain shape such that a distal end of one end side 29*a* from a body 29*b* of the flexible cable 29 becomes a ridgeline, and an end 29*c* is folded in a direction opposite to the insertion direction of the flexible cable 29. The internal electrodes 249 are illustrated in FIG. 4.

The nozzle plate 240, the flow path substrate 25, the common liquid chamber substrate 26, the compliance substrate 27, and the unit case 28 are joined to each other by disposing an adhesive, a heat-fusible film, or the like between the substrates and heating the substrates in the stacked state.

The description is returned to FIG. 1. The reciprocating mechanism 42 has a carriage guide shaft 422 whose both ends are supported by a frame (not illustrated), and a timing belt 421 extending in parallel with the carriage guide shaft 422. The carriage 32 is supported to be reciprocable by the carriage guide shaft 422 of the reciprocating mechanism 42 and is fixed to a part of the timing belt 421.

The printing section 3 is guided by the carriage guide shaft 422 and reciprocates by causing the timing belt 421 to travel forward and backward through pulleys by an operation of the carriage motor 41. Then, during this reciprocating, ink droplets are appropriately ejected from ink jet heads 100 of the head unit 35 to correspond to image data to be printed, and printing for the recording sheet P is performed. Note that, the image data may also be referred to as print data or the like.

The sheet feeding device 5 includes a sheet feeding motor 51 serving as a drive source, and a sheet feeding roller 52 that is rotated by an operation of the sheet feeding motor 51. The sheet feeding roller 52 includes a driven roller 52*a* and a driving roller 52*b* that pinch the recording sheet P vertically facing each other with a transport path of the recording sheet P interposed therebetween and the driving roller 52*b* is coupled to the sheet feeding motor 51. As a result, the sheet feeding roller 52 feeds a large number of recording sheets P installed in the tray 21 toward the printing device 4 one by one, and discharges the recording sheets P from the printing device 4 one by one. Note that, the liquid ejection device may have a configuration in which a sheet feeding cassette that accommodates the recording sheets P may be detachably attached instead of the tray 21. Further, the sheet feeding motor 51 also sends the recording sheet P corresponding to a resolution of an image in conjunction with a reciprocating operation of the printing section 3. In addition, a sheet feeding operation and a sheet sending operation can be performed by different motors, or can be performed by the same motor by a part that switches torque transmission such as an electromagnetic clutch. In the present embodiment, the sheet feeding motor 51 and the sheet feeding roller 52 constitute a transport mechanism L1.

The controller 6 performs a printing process on the recording sheet P by controlling the printing device 4, the sheet feeding device 5, and the like based on print data input from a host computer 8 such as a personal computer or a digital camera. In addition, the controller 6 displays an error message or the like on the display section of the operation panel 7 or turns on and off an LED lamp or the like, and causes each section to execute the corresponding process based on pressing signals of various switches input from the operation section. Further, the controller 6 transfers information such as an error message and an ejection abnormality to the host computer 8 as necessary. The host computer 8 is illustrated in FIG. 3.

Figure 3:
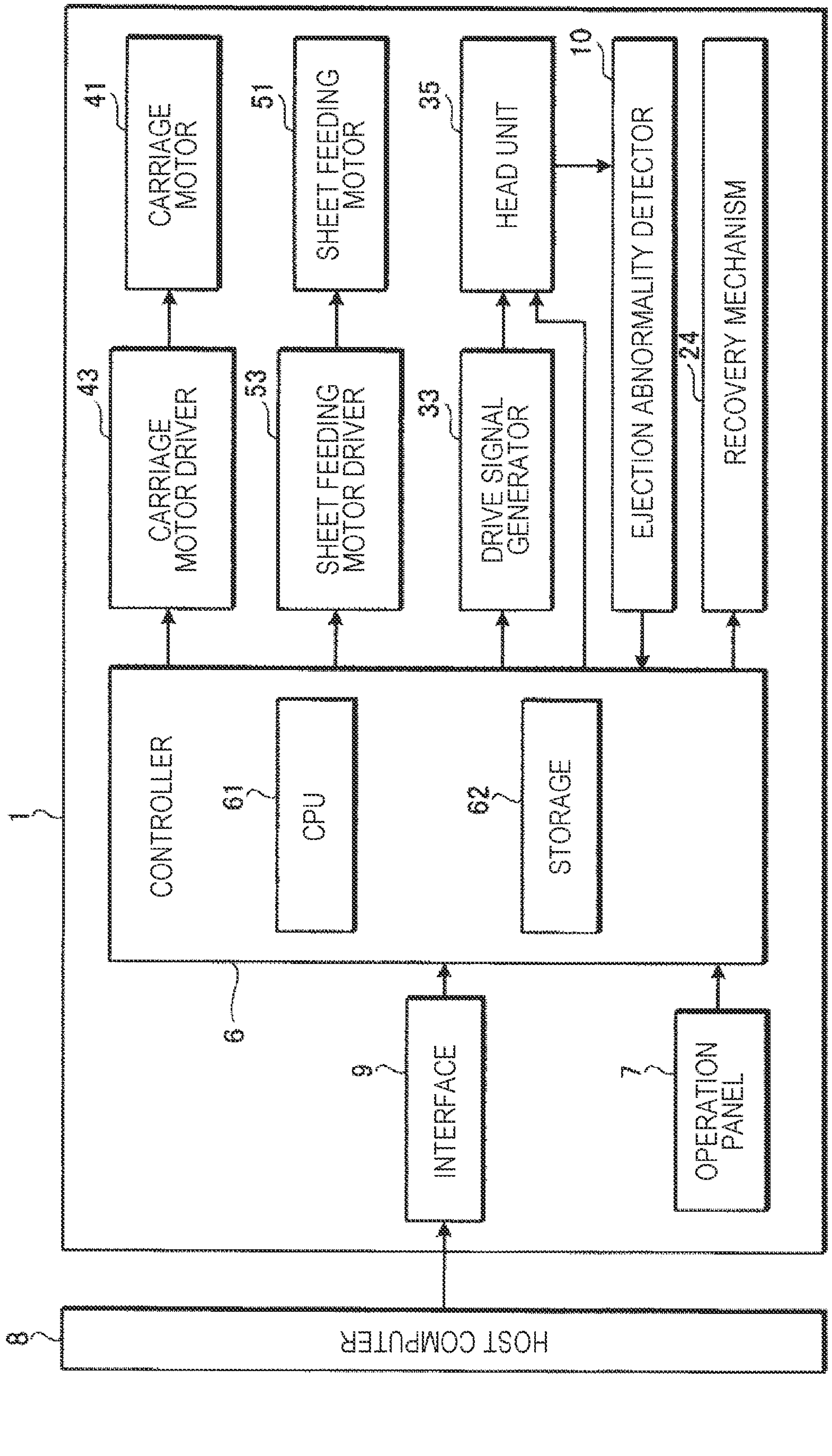
FIG. 3 is a block diagram schematically illustrating a main part of the ink jet printer according to the embodiment.

FIG. 3 is a block diagram schematically illustrating a main part of the ink jet printer of the present disclosure. In FIG. 3, the ink jet printer 1 of the present disclosure includes an interface 9 that receives print data and the like input from a host computer 8, the controller 6, the carriage motor 41, the carriage motor driver 43 that controls to drive the carriage motor 41, the sheet feeding motor 51, a sheet feeding motor driver 53 that controls to drive the sheet feeding motor 51, the head unit 35, a drive signal generator 33 that controls to drive the head unit 35, an ejection abnormality detector 10, a recovery mechanism 24, and the operation panel 7. When the ink droplets cannot be ejected from the head unit 35, the recovery mechanism 24 is a mechanism for recovering a function such that the head unit 35 normally operates. Specifically, the recovery mechanism 24 executes a flushing operation and a wiping operation. The flushing operation is a head cleaning operation in which ink droplets are ejected from all nozzles or a target nozzle 241 of the head unit 35 when a cap of the head unit 35 is attached or in a place where the ink droplets do not adhere to the recording sheet. In addition, in the wiping operation, adhering substances such as paper powder or dust adhering to a head surface are wiped off with a wiper in order to clean the nozzle plate. At this time, an inside of the nozzle 241 becomes a negative pressure, and there is a possibility that the ink of another color is pulled into. Therefore, after the wiping operation, the flushing operation is performed by ejecting a certain amount of ink droplets from all the nozzles 241 of the head unit 35. Note that, the details of the ejection abnormality detector 10 and the drive signal generator 33 will be described later.

In FIG. 3, the controller 6 includes a central processing unit (CPU) 61 and a storage 62 that execute various processes such as a printing process and an ejection abnormality detection process. The storage 62 includes electrically erasable programmable read-only memory (EEPROM) which is a type of non-volatile semiconductor memory that stores the print data input from the host computer 8 via the interface 9 in a data storage region (not illustrated), a random access memory (RAM) that temporarily stores various kinds of data when the ejection abnormality detection process and the like are executed or temporarily loads application programs such as the printing process, and a PROM which is a type of non-volatile semiconductor memory that stores control programs and the like that control the sections. Note that, each constituent element of the controller 6 is electrically coupled via a bus (not illustrated).

As described above, the printing section 3 includes the plurality of head units 35 corresponding to the colors of ink. In addition, each head unit 35 includes the plurality of nozzles 241 and the piezoelectric devices 200 corresponding to the nozzles 241. That is, the head unit 35 includes the plurality of ink jet heads 100 each having a set of nozzles 241 and piezoelectric devices 200. The ink jet head 100 is a droplet ejection head.

In addition, although not illustrated in the drawing, for example, the controller 6 is electrically coupled to various sensors that can detect a printing environment such as a remaining amount of ink in the ink cartridge 31, a position of the printing section 3, a temperature, and a humidity, and the like. When the controller 6 obtains the print data from the host computer 8 via the interface 9, the controller 6 stores the print data in the storage 62. Then, the CPU 61 executes a predetermined process on this print data, and outputs the control signals to the drive signal generator 33, each of the carriage motor driver 43 and the sheet feeding motor driver 53, and the head unit 35 based on the processing data and the input data from various sensors. When these control signals are input via the carriage motor driver 43 and the sheet feeding motor driver 53, the carriage motor 41 and the sheet feeding device 5 of the printing device 4 operate. As a result, the printing process is executed on the recording sheet P.

Figure 5:
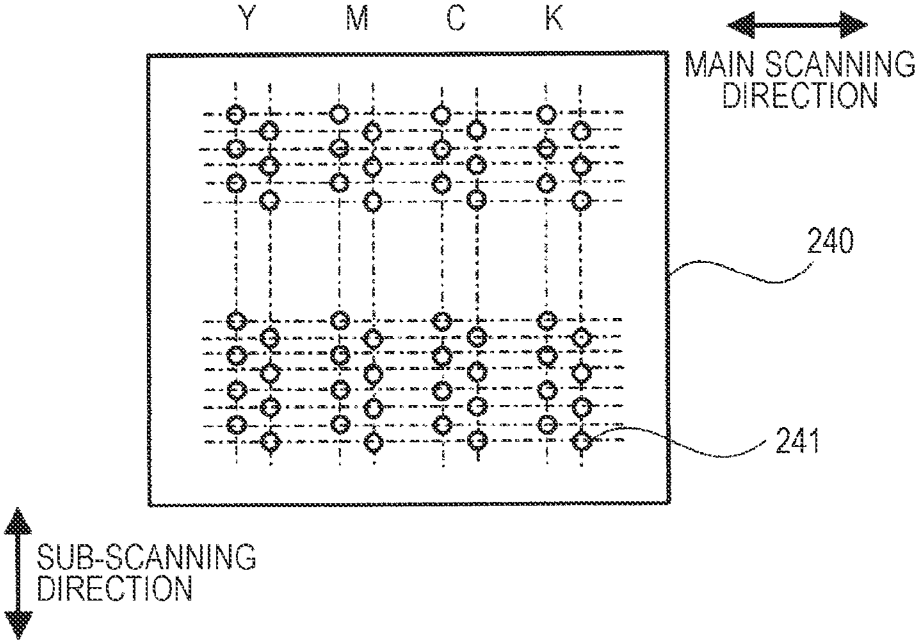
FIG. 5 is an example of a nozzle disposition pattern of a nozzle plate of the head unit using four colors of ink according to the embodiment.

Next, a structure of each head unit 35 will be described. FIG. 4 is a schematic cross-sectional view of the head unit 35 illustrated in FIG. 1. The head unit 35 corresponds to the ink jet head 100. The constituents illustrated in FIG. 4 constitute an ejection section W1. FIG. 5 is a plan view illustrating an example of a nozzle surface of the printing section 3 to which the head unit 35 illustrated in FIG. 4 is applied.

The head unit 35 illustrated in FIG. 4 ejects ink which is a liquid in the cavity 245 from the nozzle 241 by driving the piezoelectric device 200. The head unit 35 includes the nozzle plate 240 in which the nozzles 241 are formed, a cavity plate 242, a vibration plate 243, and a stacked piezoelectric device 201 formed by stacking the plurality of piezoelectric devices 200.

The cavity plate 242 is molded into a predetermined shape, and accordingly, the cavities 245 and reservoirs 246 are formed. The predetermined shape is a shape in which a recess is formed. The cavity 245 communicates with the reservoir 246 via an ink feeding port 247. In addition, the reservoir 246 communicates with the ink cartridge 31 via an ink feeding tube 431.

A lower end of the stacked piezoelectric device 201 in FIG. 4 is joined to the vibration plate 243 via an intermediate layer 244. A plurality of external electrodes 248 and internal electrodes 249 are joined to the stacked piezoelectric device 201. That is, the external electrodes 248 are joined to an outer surface of the stacked piezoelectric device 201, and the internal electrodes 249 are installed between the piezoelectric devices 200 constituting the stacked piezoelectric device 201 or inside the piezoelectric devices. In this case, some of the external electrodes 248 and the internal electrodes 249 are disposed so as to alternately overlap in the thickness direction of the piezoelectric device 200.

Then, a drive voltage waveform is applied between the external electrode 248 and the internal electrode 249 from the drive signal generator 33, and thus, the stacked piezoelectric device 201 is deformed as indicated by an arrow in FIG. 4, and expands and contracts to vibrate in an upper-lower direction in FIG. 4. As a result, the vibration plate 243 vibrates due to this vibration. A volume of the cavity 245 changes due to the vibration of the vibration plate 243, a pressure in the cavity 245 changes, and a liquid ink filled in the cavity 245 is ejected as a droplet from the nozzle 241. The amount of liquid reduced in the cavity 245 by ejecting the droplet is replenished with ink being fed from the reservoir 246. In addition, the ink is fed from the ink cartridge 31 to the reservoir 246 via the ink feeding tube 431.

Figure 6:
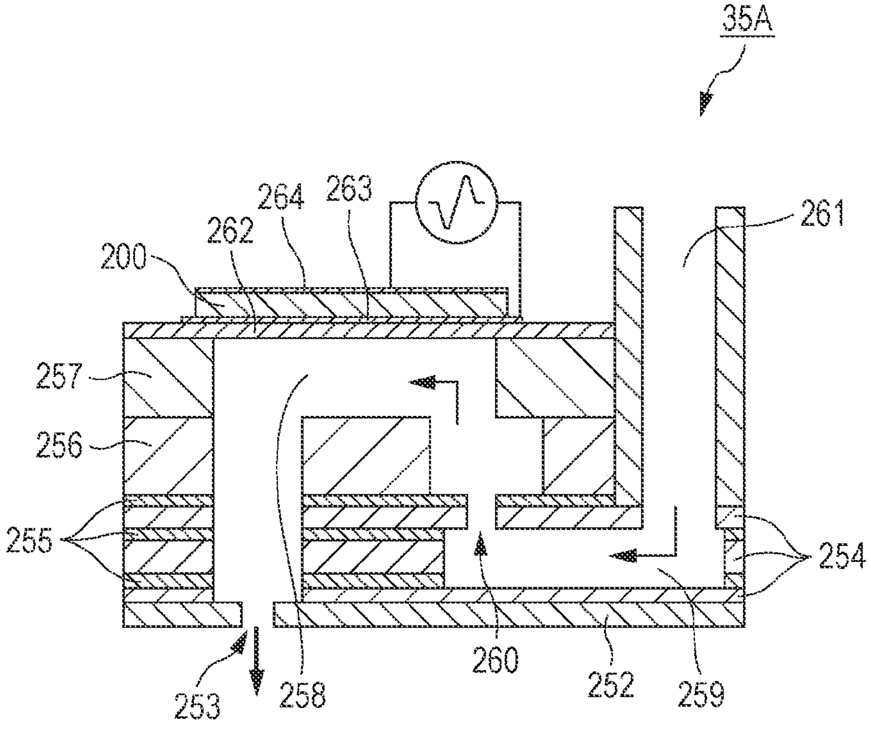
FIG. 6 is a schematic cross-sectional view illustrating another example of the head unit according to the embodiment.

Note that, an array pattern of the nozzles 241 formed at the nozzle plate 240 illustrated in FIG. 4 is disposed in a staggered manner, for example, as in a nozzle disposition pattern illustrated in FIG. 5. In addition, the pitch between the nozzles 241 can be appropriately set in accordance with a printing resolution (dpi: dot per inch). FIG. 6 illustrates the disposition pattern of the nozzles 241 when the ink cartridge 31 of four colors of ink is applied.

Next, another example of the head unit 35 will be described. In an A-th head unit 35A illustrated in FIG. 6, an A-th vibration plate 262 vibrates by driving the piezoelectric device 200, and the liquid ink in an A-th cavity 258 is ejected from an A-th nozzle 253. A metal plate 254 made of stainless steel is joined to an A-th nozzle plate 252 made of stainless steel in which the A-th nozzle 253 which is a hole is formed via an adhesive film 255, and a similar metal plate 254 made of stainless steel is further joined onto the metal plate 254 via the adhesive film 255. Then, a communication port forming plate 256 and an A-th cavity plate 257 are sequentially joined onto the metal plate 254.

The A-th nozzle plate 252, the metal plate 254, the adhesive film 255, the communication port forming plate 256, and the A-th cavity plate 257 are respectively molded into predetermined shapes. The A-th cavity 258 and an A-th reservoir 259 are formed by overlapping these plates. The predetermined shape is a shape in which a recess is formed. The A-th cavity 258 and the A-th reservoir 259 communicate with each other via an A-th ink feeding port 260. In addition, the A-th reservoir 259 communicates with an ink intake port 261.

The A-th vibration plate 262 is installed at an upper surface opening of the A-th cavity plate 257, and the piezoelectric device 200 is joined to the A-th vibration plate 262 via a lower electrode 263. In addition, an upper electrode 264 is joined to a side of the piezoelectric device 200 opposite to the lower electrode 263. The drive signal generator 33 applies and feeds a drive voltage waveform between the upper electrode 264 and the lower electrode 263, and thus, the piezoelectric device 200 vibrates. As a result, the A-th vibration plate 262 joined to the piezoelectric device vibrates. A volume of the A-th cavity 258 changes due to the vibration of the A-th vibration plate 262, a pressure in the A-th cavity 258 changes, and the liquid ink filled in the A-th cavity 258 is ejected as a droplet from the A-th nozzle 253.

The amount of liquid reduced in the A-th cavity 258 by ejecting the droplet is replenished with ink being fed from the A-th reservoir 259. In addition, ink is fed to the A-th reservoir 259 from the ink intake port 261.

Figure 7A:
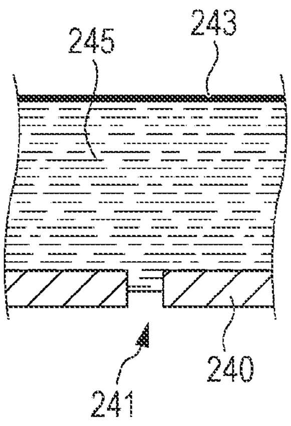
FIGS. 7A to 7C are state diagrams illustrating states of the head unit at the time of inputting a drive signal according to the embodiment.
Figure 7B:
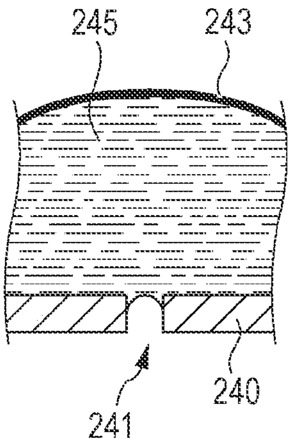
Figure 7C:
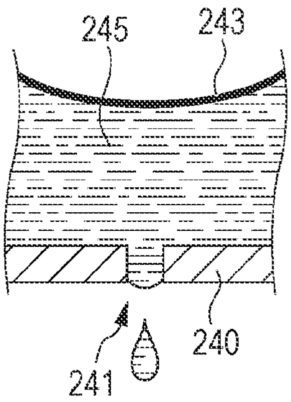

Next, the ejection of the ink droplets will be described with reference to FIGS. 7A to 7C. FIGS. 7A to 7C are state diagrams illustrating states of the head unit at the time of inputting a drive signal in the embodiment. When the drive voltage is applied from the drive signal generator 33 to the piezoelectric device 200 illustrated in FIG. 4 or 6, a mechanical force such as expansion or contraction or warping is generated in the piezoelectric device 200. Thus, the vibration plate 243 or the A-th vibration plate 262 bends in an upper direction in FIG. 4 or 6 with respect to an initial state illustrated in FIG. 7A, and the volume of the cavity 245 or the A-th cavity 258 is increased as illustrated in FIG. 7B. In this state, when the drive voltage is changed under the control of the drive signal generator 33, the vibration plate 243 or the A-th vibration plate 262 is restored by an elastic restoring force, and moves in a lower direction beyond the position of the vibration plate 243 or the A-th vibration plate 262 in the initial state, and the volume of the cavity 245 or the A-th cavity 258 is rapidly decreased as illustrated in FIG. 7C. At this time, due to a compressive pressure generated in the cavity 245 or the A-th cavity 258, a part of the ink which is the liquid material that fills the cavity 245 or the A-th cavity 258 is ejected as the ink droplet from the nozzle 241 or the A-th nozzle 253 that communicates with the cavity 245 or the A-th cavity 258.

The vibration plate 243 of each cavity 245 damped-vibrates until a drive voltage is input by a next drive signal and an ink droplet is ejected again by an ink ejection operation using the drive signal of the drive signal generator 33, which is a series of operations. Hereinafter, this damped vibration is also referred to as residual vibration. It is assumed that the residual vibration of the vibration plate 243 has a natural vibration frequency determined by an acoustic resistance r due to shapes of the nozzle 241 and the ink feeding port 247, an ink viscosity, or the like, an inertance m due to a weight of the ink in the flow path, and a compliance Cm of the vibration plate 243.

Figure 8:
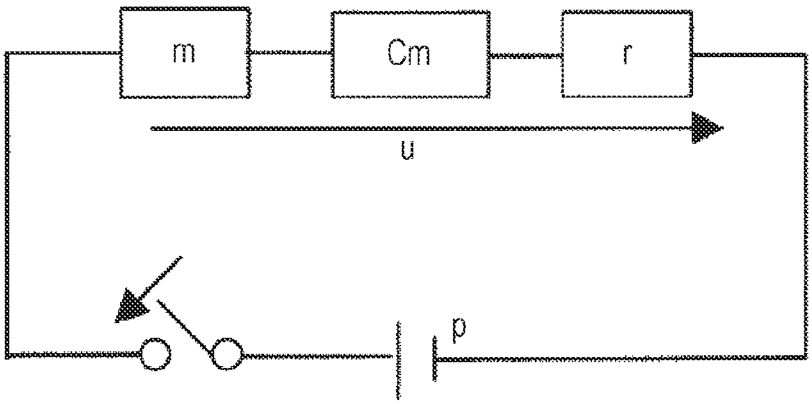
FIG. 8 is a circuit diagram illustrating a calculation model of simple vibration assuming residual vibration of a vibration plate of FIG. 4 according to the embodiment.

A calculation model of the residual vibration of the vibration plate 243 based on the above assumption will be described. FIG. 8 is a circuit diagram illustrating a calculation model of simple vibration assuming the residual vibration of the vibration plate 243. As described above, the calculation model of the residual vibration of the vibration plate 243 can be represented by a sound pressure p and the inertance m, the compliance Cm, and the acoustic resistance r described above. Then, when a step response at the time of applying the sound pressure p to the circuit of FIG. 8 is calculated for a volume velocity u, the following equations are obtained.

$$u = \{p/(\omega \cdot m)\}e^{-\omega t} \cdot \sin\omega t$$

$$\omega = \{1/(m \cdot Cm) - \alpha^2\}^{1/2}$$

$$\alpha = r/2m$$

Figure 9:
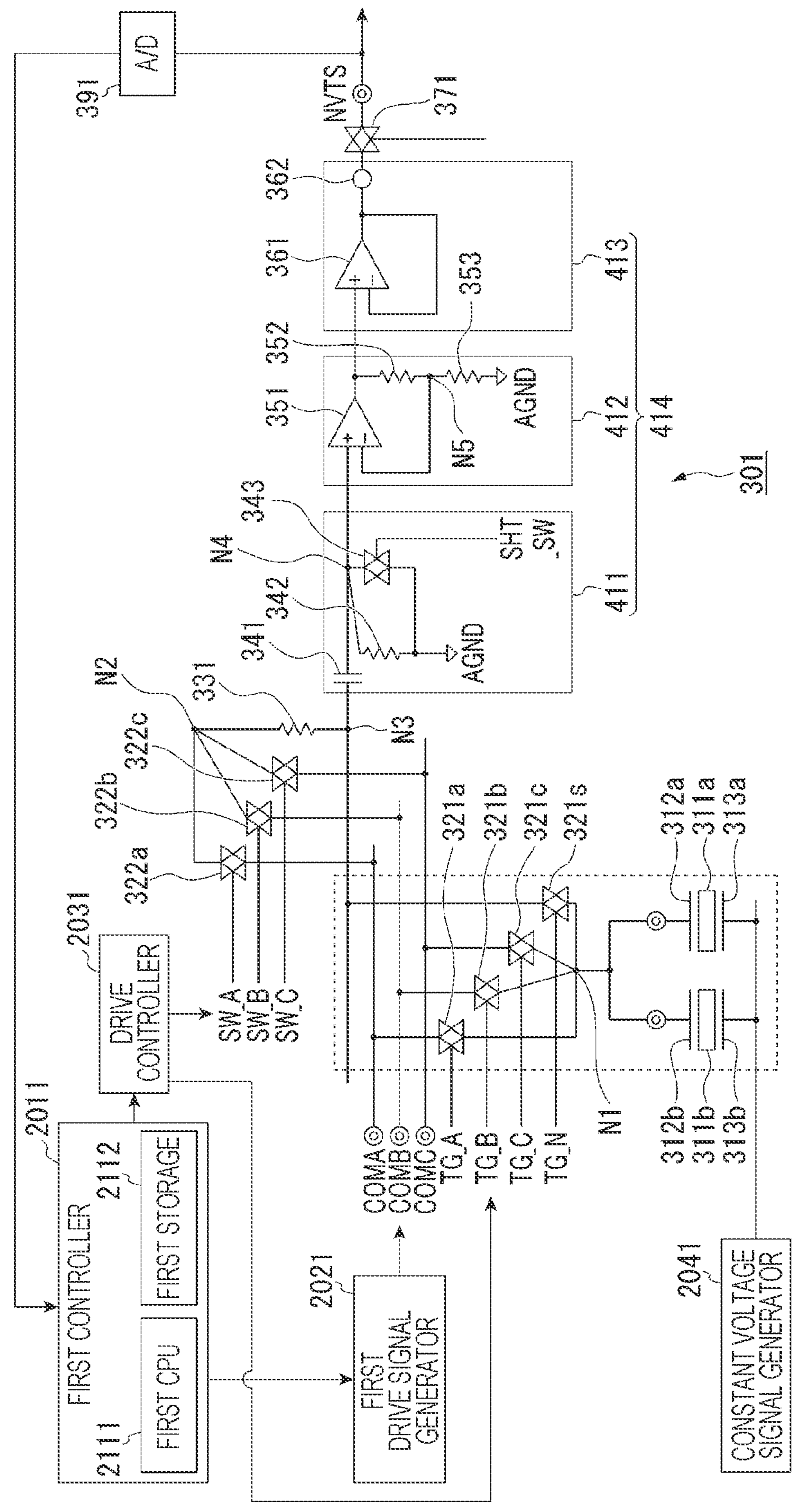
FIG. 9 is a diagram illustrating an example of a circuit of the head unit having a residual vibration detector according to the embodiment.

FIG. 9 is a diagram illustrating an example of a circuit of a first head unit 301 having a residual vibration detector according to the embodiment. Note that, FIG. 9 illustrates a first controller 2011, a first drive signal generator 2021, a drive controller 2031, a constant voltage signal generator 2041, and an analog-to-digital (A/D) converter 391, and these components are provided inside the first head unit 301. As another example, the first drive signal generator 2021 may be provided outside the first head unit 301, and the first controller 2011, the drive controller 2031, the constant voltage signal generator 2041, and the A/D converter 391 may be provided inside the first head unit 301. Here, in the present embodiment, the first controller 2011 is an example of the residual vibration detector. That is, in the present embodiment, the first controller 2011 has a function of detecting a residual vibration signal. The residual vibration detector may further include the A/D converter 391. Note that, the function of the residual vibration detector may be provided in a constituent other than the first controller 2011. For example, in the present embodiment, although a case where the first controller 2011 has both the function of the residual vibration detector and the function of the controller is described, these functions may be provided in separate constituents.

The first controller 2011 includes a first CPU 2111 and a first storage 2112. The first storage 2112 may include, for example, various memories. Note that, the first controller 2011 may be formed by using, for example, a microcomputer. The constant voltage signal generator 2041 generates and feeds a signal having a constant voltage. In the present embodiment, the constant voltage corresponds to a fixed potential VBS. In the present embodiment, a state where a switch in an electric circuit is energized is also referred to as on, and a state where the switch is not energized is referred to as off.

Note that, the first controller 2011, the first CPU 2111, the first storage 2112, the first drive signal generator 2021, and the first head unit 301 illustrated in FIG. 9 correspond to the controller 6, the CPU 61, the storage 62, the drive signal generator 33, and the head unit 35 in the example of FIG. 3, respectively.

The first head unit 301 includes a 1a-th piezoelectric device 311*a*, a 1b-th piezoelectric device 311*b*, a 1a-th electrode 312*a* and a 2a-th electrode 313*a* disposed above and below the 1a-th piezoelectric device 311*a*, and a 1b-th electrode 312*b* and a 2b-th electrode 313*b* disposed above and below the 1b-th piezoelectric device 311*b*. The 2a-th electrode 313*a* and the 2b-th electrode 313*b* are coupled to the fixed potential VBS generated by the constant voltage signal generator 2041. Here, in the present embodiment, although a case where two piezoelectric devices are used in parallel is described, the number of such piezoelectric devices may be any number.

The first head unit 301 includes a drive switch 321*a*, a drive switch 321*b*, and a drive switch 321*c* to correspond to a drive signal COMA, a drive signal COMB, and a drive signal COMC.

Here, in the present embodiment, although a configuration in which the drive signal COMA, the drive signal COMB, and the drive signal COMC, which have different waveforms, can be switched and used as the drive signals is described, the number of switchable drive signals is not particularly limited, and, for example, one type of drive signal may be used. That is, in the present embodiment, although three switches such as the drive switch 321*a*, the drive switch 321*b*, and the drive switch 321*c* are described, one or two of these switches may be used.

One end of the drive switch 321*a* is coupled to a terminal of the drive signal COMA. One end of the drive switch 321*b* is coupled to a terminal of the drive signal COMB. One end of the drive switch 321*c* is coupled to a terminal of the drive signal COMC. The other end of the drive switch 321*a*, the other end of the drive switch 321*b*, the other end of the drive switch 321*c*, one end of a detection nozzle selection switch 321*s*, the 1a-th electrode 312*a*, and the 1b-th electrode 312*b* are electrically coupled at a first node N1.

One end of a bias switch 322*a* is coupled to the terminal of the drive signal COMA. One end of a bias switch 322*b* is coupled to the terminal of the drive signal COMB. One end of a bias switch 322*c* is coupled to the terminal of the drive signal COMC. The other end of the detection nozzle selection switch 321*s*, one end of a first resistor 331, and one end of a first capacitor 341 are electrically coupled at a third node N3. The other end of the first resistor 331, the other end of the bias switch 322*a*, the other end of the bias switch 322*b*, and the other end of the bias switch 322*c* are electrically coupled at a second node N2.

The drive switch 321*a* switches a coupling state between the drive signal COMA and the first node N1 between on and off. The drive switch 321*b* switches a coupling state between the drive signal COMB and the first node N1 between on and off. The drive switch 321*c* switches a coupling state between the drive signal COMC and the first node N1 between on and off. Here, the three drive signals COMA to COMC are generated by the first drive signal generator 2021. The first drive signal generator 2021 is controlled by the first controller 2011.

The first head unit 301 includes the detection nozzle selection switch 321*s*. The detection nozzle selection switch 321*s* switches a coupling state between the first node N1 and the third node N3 between on and off. Here, the drive switch 321*a*, the drive switch 321*b*, the drive switch 321*c*, and the detection nozzle selection switch 321*s* are controlled by the drive controller 2031. The drive controller 2031 is controlled by the first controller 2011.

Here, each of the drive switch 321*a*, the drive switch 321*b*, the drive switch 321*c*, and the detection nozzle selection switch 321*s* may be formed by using, for example, a transfer gate (TG). Note that, the transfer gate includes, for example, a P-channel transistor and an N-channel transistor coupled in parallel, but may include a transistor of one channel.

The first head unit 301 includes the bias switch 322*a*, the bias switch 322*b*, and the bias switch 322*c* to correspond to the drive signal COMA, the drive signal COMB, and the drive signal COMC.

Here, the bias switch 322*a*, the bias switch 322*b*, and the bias switch 322*c* correspond to the drive switch 321*a*, the drive switch 321*b*, and the drive switch 321*c*, respectively, and when a part of the drive switch 321*a*, the drive switch 321*b*, and the drive switch 321*c* is not provided, the corresponding bias switch is not also provided.

The bias switch 322*a* switches a coupling state between the third node N3 and the drive signal COMA between on and off. The bias switch 322*b* switches a coupling state between the third node N3 and the drive signal COMB between on and off. The bias switch 322*c* switches a coupling state between the third node N3 and the drive signal COMC between on and off. Here, the bias switch 322*a*, the bias switch 322*b*, and the bias switch 322*c* are controlled by the drive controller 2031. The drive controller 2031 is controlled by the first controller 2011.

Here, each of the bias switch 322*a*, the bias switch 322*b*, and the bias switch 322*c* may be formed by using, for example, a transfer gate.

The first head unit 301 includes the first resistor 331, a high-pass filter (HPF) 411, a gain regulator 412, a buffer 413, and a 3s-th switch 371. In the present embodiment, a residual vibration waveform acquirer 414 that acquires a waveform of the residual vibration from the high-pass filter 411, the gain regulator 412, and the buffer 413 is formed. The high-pass filter 411 includes the first capacitor 341, a second resistor 342, and a detection switch 343. The gain regulator 412 includes a first operational amplifier 351, a third resistor 352, and a fourth resistor 353.

The buffer 413 includes a second operational amplifier 361 and a peak hold circuit 362. In the present embodiment, regarding a signal detected by the second operational amplifier 361, a peak of the signal can be held and output by the peak hold circuit 362. The peak is, for example, a local maximum point or a local minimum point of the signal. Here, in the present embodiment, although a case where the peak hold circuit 362 that performs peak hold is provided in the buffer 413 is described, as another example, a configuration in which the peak hold circuit 362 is not provided in the buffer 413 and a function of the peak hold circuit is provided in the first controller 2011 may be used. In this case, the function of the peak hold circuit may be realized, for example, by a processor executing a predetermined program. As described above, a process of detecting the peak of the signal may be performed by the first controller 2011 or the like.

Here, in the present embodiment, the gain regulator 412 includes a negative feedback type amplifier using the first operational amplifier 351, and can adjust an amplitude of an output signal by adjusting midpoints of the third resistor 352 and the fourth resistor 353 which are variable resistors that divide a voltage of the output signal. In addition, the second operational amplifier 361 of the buffer 413 converts an impedance and outputs a detection signal having a low impedance. In the present embodiment, the second operational amplifier 361 that functions as a buffer is a voltage follower.

Note that, for example, a low-pass filter may be provided between the gain regulator 412 and the buffer 413. The low-pass filter attenuates a high frequency component of the signal. The low-pass filter may be, for example, a multiple feedback type using an operational amplifier, and attenuates a frequency component higher than a frequency bandwidth of the residual vibration. A noise component can be removed by limiting a frequency range to be detected by the low-pass filter.

The first resistor 331 functions as a bias resistor that feeds a voltage of the drive signal COMA, the drive signal COMB, or the drive signal COMC.

The other end of the first capacitor 341 is coupled to a + input terminal of the first operational amplifier 351. The other end of the first capacitor 341, the + input terminal of the first operational amplifier 351, one end of the second resistor 342, and one end of the detection switch 343 are electrically coupled at a fourth node N4. The other end of the second resistor and the other end of the detection switch 343 are coupled to an analog ground AGND. The detection switch 343 is controlled by the drive controller 2031. The drive controller 2031 is controlled by the first controller 2011.

Here, a potential of the analog ground AGND is set, for example, to a center potential between a high power supply potential and a low power supply potential of the buffer 413. The detection switch 343 may be formed by using, for example, a transfer gate.

An output terminal of the first operational amplifier 351 and a + input terminal of the second operational amplifier 361 are coupled to each other. The third resistor 352 and the fourth resistor 353 are coupled in series between a point between the output terminal of the first operational amplifier 351 and the + input terminal of the second operational amplifier 361 and the analog ground AGND. A − input terminal of the first operational amplifier 351, one end of the third resistor 352, and one end of the fourth resistor 353 are electrically coupled at a fifth node N5.

A − input terminal and an output terminal of the second operational amplifier 361 are coupled to each other. The output terminal of the second operational amplifier 361 and one end of the 3s-th switch 371 are coupled to each other. The other end of the 3s-th switch 371 is coupled to an output terminal of the residual vibration signal. The 3s-th switch 371 is controlled by the drive controller 2031. The drive controller 2031 is controlled by the first controller 2011. The 3s-th switch 371 may be formed by using, for example, a transfer gate.

The residual vibration signal of which the waveform is acquired by the residual vibration waveform acquirer 414 is output from the output terminal from the buffer 413 via the 3s-th switch 371. An NVTS terminal output that is an output from the output terminal is input to the first controller 2011 via the A/D converter 391. The A/D converter 391 performs A/D conversion of the residual vibration signal that is an analog signal output from the output terminal, and outputs a digital signal that is the result of the conversion to the first controller 2011. Note that, the function of the A/D converter 391 may be provided in another part, for example, inside the first controller 2011.

In the example in FIG. 9, the drive switch 321*a*, the drive switch 321*b*, and the drive switch 321*c* are switches for selectively applying the drive signal COMA, the drive signal COMB, and the drive signal COMC to the first node N1. In addition, the detection nozzle selection switch 321*s* is a switch for switching between a state where the residual vibration signal can be fed to the residual vibration signal detector and a state where the residual vibration signal cannot be fed to the residual vibration signal detector by switching the coupling state between the first node N1 and the third node N3 between on and off. In addition, the bias switch 322*a*, the bias switch 322*b*, and the bias switch 322*c* are switches for selectively applying the drive signal COMA, the drive signal COMB, and the drive signal COMC to the second node N2. In addition, the detection switch 343 is a switch for switching between a state where the residual vibration signal cannot be fed to the residual vibration signal detector and a state where the residual vibration signal can be fed to the residual vibration signal detector by switching a coupling state between the fourth node N4 and the analog ground AGND between on and off. In addition, the 3s-th switch 371 is a switch for switching between a state where the residual vibration signal can be fed to the residual vibration signal detector and a state where the residual vibration signal cannot be fed to the residual vibration signal detector by switching a coupling state between the peak hold circuit 362 and a NVTS terminal that is the output terminal between on and off.

Here, in the present embodiment, a test drive signal is applied to the 1a-th piezoelectric device 311*a* and the 1b-th piezoelectric device 311*b* during a printing operation, and the residual vibration which is a pressure change in the cavity generated by this application is detected as a change in electromotive force of the 1a-th piezoelectric device 311*a* and the 1b-th piezoelectric device 311*b* by the residual vibration detector. The drive controller 2031 feeds the test drive signal to the 1a-th piezoelectric device 311*a* and the 1b-th piezoelectric device 311*b* based on the control signal, and feeds electromotive forces of the 1a-th piezoelectric device 311*a* and the 1b-th piezoelectric device 311*b* to the residual vibration detector at the time of detecting the residual vibration. The residual vibration detector detects, as the residual vibration signal, a signal indicating the change in electromotive force of the 1a-th piezoelectric device 311*a* and the 1b-th piezoelectric device 311*b*.

Although detailed illustration is omitted in the example in FIG. 9, the first head unit 301 includes a plurality of piezoelectric device sections to correspond to the plurality of nozzles. The piezoelectric device section includes one or more piezoelectric devices. In the example of FIG. 9, although a case where a combination of the 1a-th piezoelectric device 311*a* and the 1b-th piezoelectric device 311*b* which are two piezoelectric devices is used as the piezoelectric device section is described, the present disclosure is not limited thereto, and, for example, the piezoelectric device may be used alone.

The drive switch 321*a* to the drive switch 321*c* are turned on at high levels of the control signals to apply the drive signals to the 1a-th piezoelectric device 311*a* and the 1b-th piezoelectric device 311*b*, and are turned off at low levels of the control signals not to apply the drive signals to the 1a-th piezoelectric device 311*a* and the 1b-th piezoelectric device 311*b*. That is, the drive switch 321*a* to the drive switch 321*c* are disposed so as to be able to switch whether or not to apply the drive signals to the 1a-th piezoelectric device 311*a* and the 1b-th piezoelectric device 311*b*.

On the other hand, the detection nozzle selection switch 321*s* is turned on at a high level of the control signal to apply the electromotive force change of the 1a-th piezoelectric device 311*a* and the 1b-th piezoelectric device 311*b* to the third node N3, and is turned off at a low level of the control signal not to apply the electromotive force change of the 1a-th piezoelectric device 311*a* and the 1b-th piezoelectric device 311*b* to the third node N3. That is, the detection nozzle selection switch 321*s* can switch whether or not to apply the electromotive force change of the 1a-th piezoelectric device 311*a* and the 1b-th piezoelectric device 311*b* to the third node N3. As described above, the detection nozzle selection switch 321*s* sets a state where the signal cannot be fed to the residual vibration signal detector in the off-state, and sets a state where the signal can be fed to the residual vibration signal detector in the on-state.

Note that, in the present embodiment, a timing at which the drive switches 321*a* to 321*c* are switched from on to off and a timing at which the detection switch 343 is switched from on to off are set to the same timing. That is, the drive switches 321*a* to 321*c* are switched from on to off and the feeding of the drive signals to the 1a-th piezoelectric device 311*a* and the 1b-th piezoelectric device 311*b* is stopped. Simultaneously, the detection switch 343 is switched from on to off and the electromotive force change of the 1a-th piezoelectric device 311*a* and the 1b-th piezoelectric device 311*b* are applied to the fourth node N4. Thus, a state where the signal can be fed to the residual vibration signal detector is achieved.

The bias switch 322*a* to the bias switch 322*c* are turned on at high levels of the control signals, and are turned off at low levels of the control signals.

The detection switch 343 is turned on at a high level of the control signal, and is turned off at a low level of the control signal. The detection switch 343 is turned on, and thus, a potential of the input terminal of the buffer 413 can be clamped to the analog ground AGND. The 3s-th switch 371 is turned on at a high level of the control signal, and is turned off at a low level of the control signal.

Incidentally, a maximum potential of the drive signal in the present embodiment is 42 V, the high power supply potential of the buffer 413 is 3.3 V, and the low power supply potential is 0 V. The reason is that a drive signal of a large amplitude is required to drive the 1a-th piezoelectric device 311*a* and the 1b-th piezoelectric device 311*b*, and the buffer 413 is an analog signal processing circuit and does not require a large dynamic range.

The change in electromotive voltage of the 1a-th piezoelectric device 311*a* and the 1b-th piezoelectric device 311*b* reflects a change in pressure inside the cavity. Thus, the frequency bandwidth of the residual vibration is narrower than a frequency bandwidth of the drive signal. On the other hand, noise may be superimposed on a signal path of the residual vibration. The high-pass filter 411 attenuates a frequency component in a frequency lower than the frequency bandwidth of the residual vibration. As a result, the accuracy of the residual vibration detected by the residual vibration detector can be improved.

In addition, in the high-pass filter 411, a DC component is cut by the first capacitor 341. Compared to the maximum potential of the drive signal, since a potential of an amplitude of the residual vibration is lower, it is not suitable for direct-current coupling. In the present embodiment, the buffer 413 in a subsequent stage can be normally operated by cutting the DC component in the high-pass filter 411.

Further, the detection switch 343 is turned on except for a period in which the residual vibration is detected, and the fourth node N4 is clamped to the analog ground AGND. That is, the detection switch 343 is on in a period in which the drive signal of the first capacitor 341 and a potential on the piezoelectric device side significantly change. Even though the DC component is cut by the first capacitor 341, when the potential significantly changes, a potential of the fourth node N4 significantly changes.

In an electronic circuit, when a signal of a large amplitude exceeding a dynamic range is fed as described above, each of circuit elements is charged with electric charges, and it may take a long time for the electronic circuit to operate normally. In addition, it is necessary to increase a withstand voltage of a part such as a transistor that constitutes the electronic circuit. By contrast, in the present embodiment, the detection switch 343 is turned on in the period in which the drive signal of the first capacitor 341 and the potential on the piezoelectric device side significantly change, and the potential of the input terminal of the buffer 413 is clamped to the analog ground AGND. As a result, the detection of the residual vibration can be started immediately in the detection period, and a withstand voltage of a part constituting the buffer 413 can be further lowered.

FIG. 10 is a diagram illustrating an example of control contents according to the embodiment. FIG. 10 illustrates a control content table 3011, a LAT internal signal 3021, a TSIG internal signal 3022, states ST1 to ST5, and a piezoelectric device drive signal 3023 of the drive signal COM.

The control content table 3011 represents a timing, a pulse edge, a state, an operation, and a detection-state. An NVTS terminal output, TG_A/B/C, TG_N, SW_A/B/C, and SHT_SW are shown as the operation.

A first pulse of TSIG and a second pulse of TSIG after LAT rising are shown as the timing. Rising and falling are shown for the pulse edge. States ST1 to ST5 are shown as the states.

The NVTS terminal output represents an output of the output terminal of the residual vibration signal. HiZ representing a high impedance and a detection-state representing a state where the residual vibration is detected are shown as the NVTS terminal output. A switching state between on and off is illustrated as TG_A/B/C for the drive switch 321*a*, the drive switch 321*b*, and the drive switch 321*c*. Note that, in the example in FIG. 10, in order to simplify the description, on and off for these three switches are collectively shown.

A switching state between on and off is shown as TG_N for the detection nozzle selection switch 321*s*. A switching state between on and off is illustrated as SW_A/B/C for the bias switch 322*a*, the bias switch 322*b*, and the bias switch 322*c*. Note that, in the example in FIG. 10, in order to simplify the description, on and off for these three switches are collectively shown.

A switching state between on and off is shown as SHT_SW for the detection switch 343.

Figure 11:
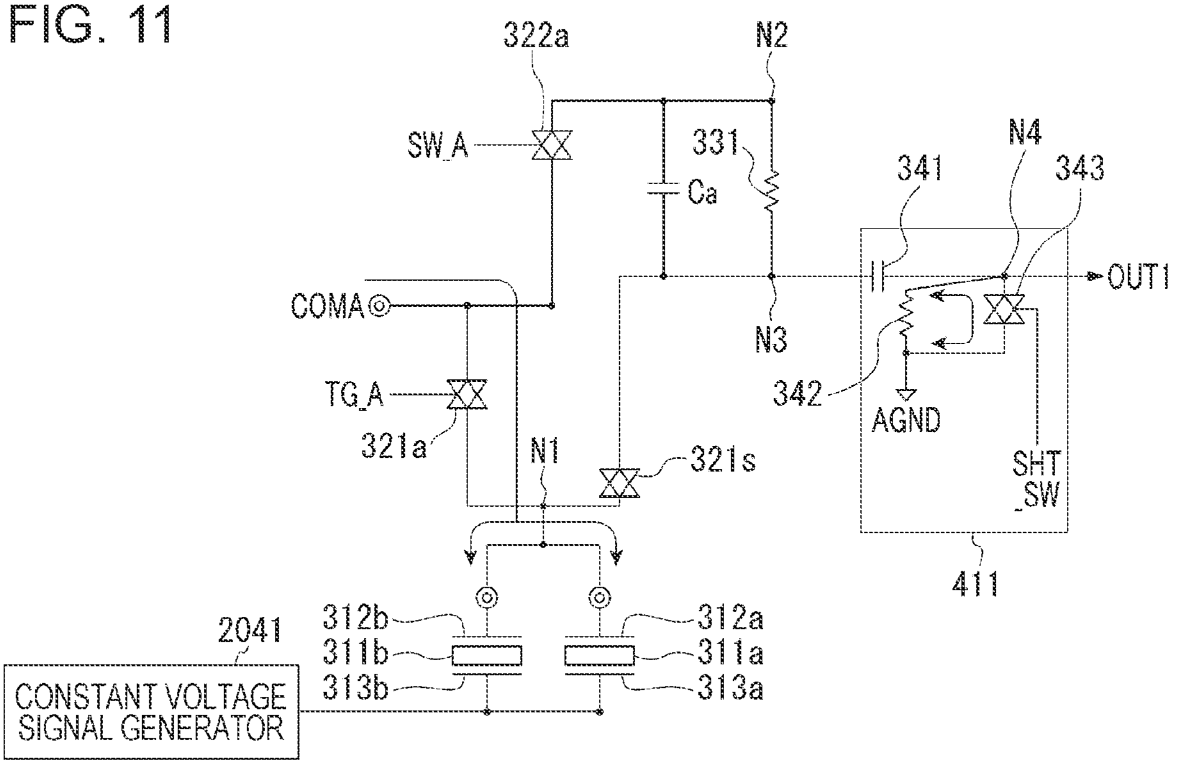
FIG. 11 is an explanatory diagram illustrating an on-state and an off-state of a switch in periods of states ST1 and ST5.
Figure 12:
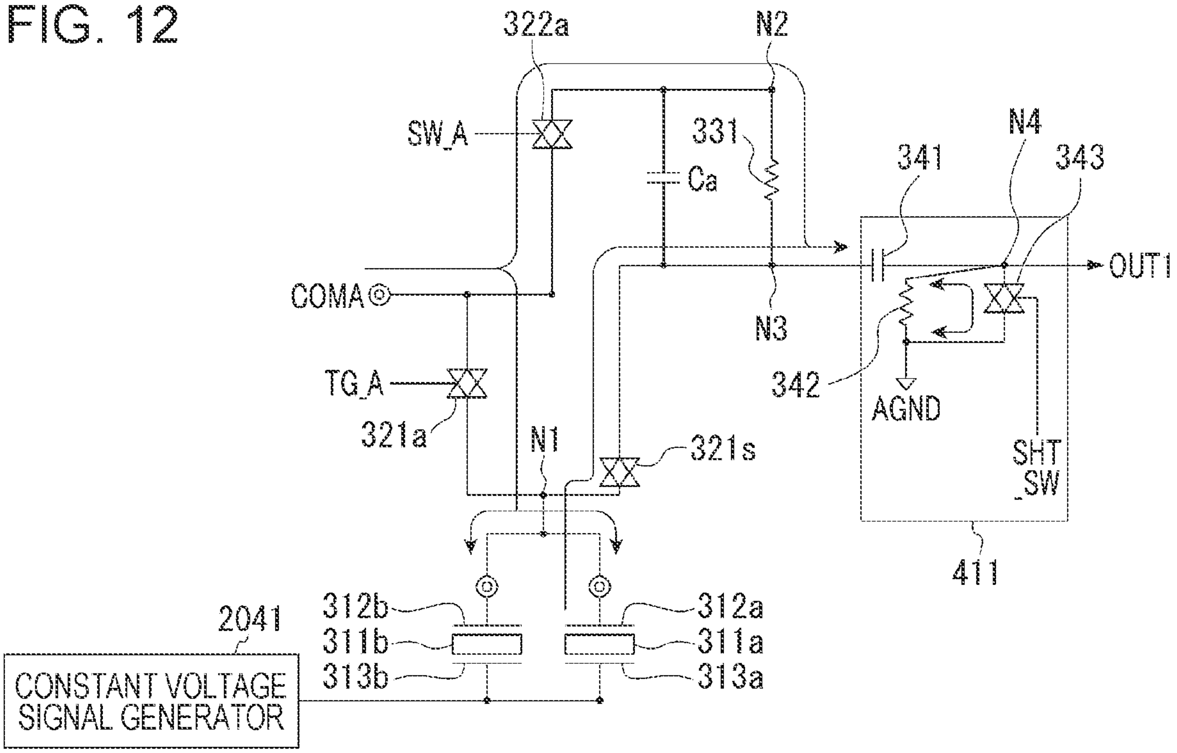
FIG. 12 is an explanatory diagram illustrating an on-state and an off-state of the switch in periods of states ST2 and ST4.
Figure 13:
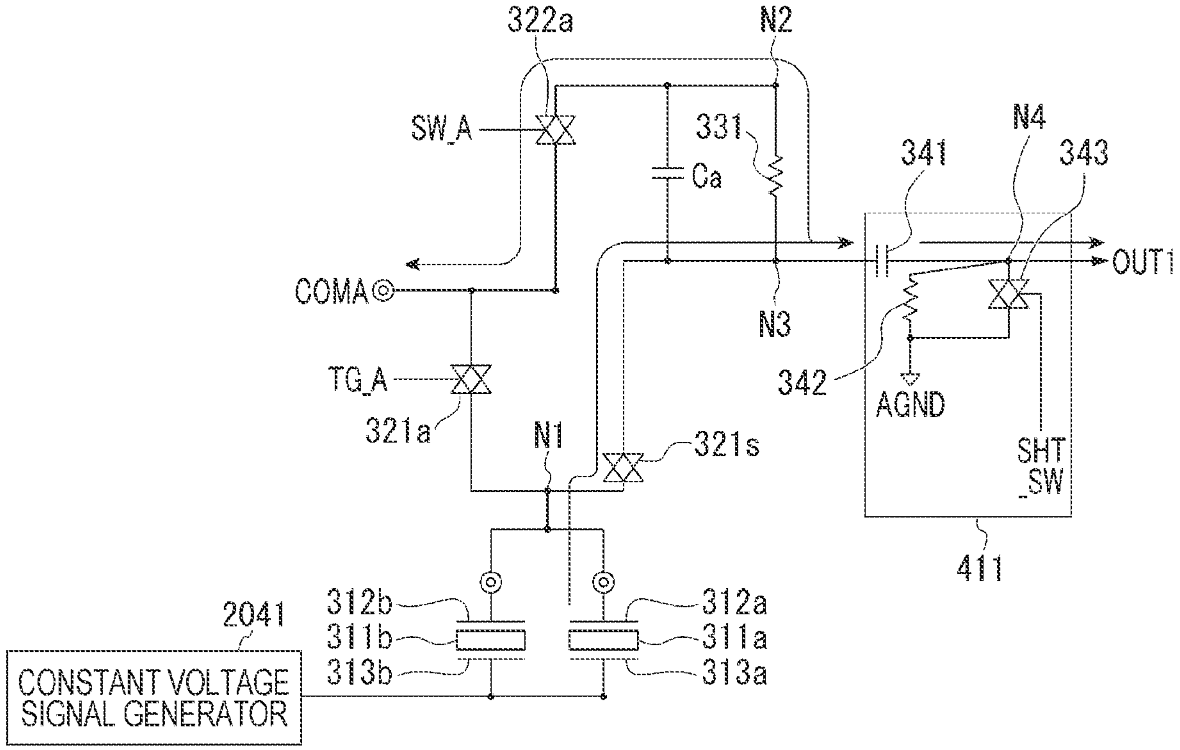
FIG. 13 is an explanatory diagram illustrating an on-state and an off-state of the switch in a period of state ST3.

Next, an operation of each switch will be described. A timing chart illustrating the operation of each switch illustrated in FIG. 10 will be described as an example. FIG. 11 is an explanatory diagram illustrating an on-state and an off-state of the switch in periods of states ST1 and ST5. FIG. 12 is an explanatory diagram illustrating an on-state and an off-state of the switch in periods of states ST2 and ST4. FIG. 13 is an explanatory diagram illustrating an on-state and an off-state of the switch in a period of state ST3. Note that, in the present example, ejection states of ink droplets are detected for the nozzles 241 corresponding to the 1a-th piezoelectric device 311*a* and the 1b-th piezoelectric device 311*b* illustrated in FIG. 9.

In addition, in the present example, a case where driving is performed by the drive signal COMA is described, and for the drive signal COMB and the drive signal COMC that are other drive signals, the drive switch 321*b* and the drive switch 321*c* are constantly turned off, and the bias switch 322*b* and the bias switch 322*c* are constantly turned off. In the examples of FIGS. 11 to 13, a circuit section related to the drive signal COMA is illustrated, and circuit sections related to the drive signal COMB and the drive signal COMC are not illustrated. Note that, an operation when driving is performed by the drive signal COMB or the drive signal COMC which is another drive signal is the same as an operation when driving is performed by the drive signal COMA.

In the period of state ST1, an inspection pulse P1 is included in the drive signal COMA. In the period of state ST1, TG_A is turned on, TG_N is turned off, SW_A is turned off, and SHT_SW is turned on. Accordingly, the states of the drive switch 321*a*, the detection nozzle selection switch 321*s*, and the detection switch 343 are illustrated in FIG. 11. When the drive switch 321*a* is turned on and the inspection pulse P1 is applied to the 1a-th electrode 312*a* and the 1b-th electrode 312*b*, the 1a-th piezoelectric device 311*a* and the 1b-th piezoelectric device 311*b* bend in a direction in which the ink droplets are pulled into the cavities in synchronization with the rising of the inspection pulse P1, and bends in a direction in which the ink droplets are pushed out from the cavities in synchronization with the falling of the inspection pulse P1. Here, an amplitude, a phase, and a falling time of the inspection pulse P1 may be adjusted such that the ink droplets are not ejected from the nozzles 241, or the ink droplets may be ejected from the nozzles 241 by the inspection pulse P1. When the inspection pulse P1 has a waveform corresponding to non-ejection, the residual vibration can be detected during normal printing. On the other hand, when the inspection pulse P1 has a waveform corresponding to ejection, the head unit 35 may be moved to a position deviated from the recording sheet to eject the ink droplets.

Subsequently, in the period of state ST2, the drive signal COMA is at a predetermined potential Vx. In the period of state ST2, since TG_A, TG_N, SW_A, and SHT_SW are turned on, the drive switch 321*a*, the detection nozzle selection switch 321*s*, the bias switch 322*a*, and the detection switch 343 are turned on. As a result, as illustrated in FIG. 12, a potential of the second node N2 becomes the predetermined potential Vx, and a potential of the third node N3 also becomes a predetermined potential Vx.

Subsequently, in the period of state ST3, the drive signal COMA is at the predetermined potential Vx. In the period of state ST3, since TG_N and SW_A are maintained in the on-state, the detection nozzle selection switch 321*s* is turned on. On the other hand, since TG_A and SHT_SW are turned off, the drive switch 321*a* and the detection switch 343 are turned off. As a result, as illustrated in FIG. 13, in a state where the potential of the second node N2 becomes the predetermined potential Vx and the potential of the third node N3 is biased by the first resistor 331, the electromotive force generated by the 1a-th piezoelectric device 311*a* and the 1b-th piezoelectric device 311*b* is taken out as a first output signal OUT1 via the high-pass filter 411. Here, in the present example, a detection start timing is a timing at which the state is switched from state ST2 to state ST3, and is a timing at which a TSIG pulse falls.

Subsequently, in the period of state ST4, the drive signal COMA is at the predetermined potential Vx. Similar to the period of state ST2, in the period of state ST4, since TG_A, TG_N, SW_A, and SHT_SW are turned on the drive switch 321*a*, the detection nozzle selection switch 321*s*, the bias switch 322*a*, and the detection switch 343 are turned on. As a result, as illustrated in FIG. 12, the potential of the second node N2 becomes the predetermined potential Vx, and the potential of the third node N3 also becomes the predetermined potential Vx.

Subsequently, similar to the period of state ST1, in the period of state ST5, since TG_A is turned on and SHT_SW is turned on, the drive switch 321*a* and the detection switch 343 are turned on. On the other hand, since TG_N is turned off, the detection nozzle selection switch 321*s* is turned off. As a result, as illustrated in FIG. 11, the drive signal COMA is applied to the 1a-th electrode 312*a* and the 1b-th electrode 312*b* via the drive switch 321*a*. In addition, since SHT_SW is turned on, the potential of the fourth node N4 is clamped to the analog ground AGND.

Here, when a first state is a state where the drive switch 321*a* is turned on and the detection nozzle selection switch 321*s* is turned off, a second state is a state where the drive switch 321*a* is turned on and the detection nozzle selection switch 321*s* is turned on, and a third state is a state where the drive switch 321*a* is turned off and the detection nozzle selection switch 321*s* is turned on, the drive controller 2031 controls the drive switch 321*a* and the detection nozzle selection switch 321*s* in order of state ST1 which is the first state→state ST2 which is the second state→state ST3 which is the third state. In addition, the drive controller 2031 controls the drive switch 321*a* and the detection nozzle selection switch 321*s* in order of state ST3 which is the third state→state ST4 which is the second state→state ST5 which is the first state.

As described above, the reason why the second state is provided in the middle of the transition from the first state to the third state and in the middle of the transition from the third state to the first state is to prevent switching noise from being generated due to the change in the potential of the third node N3 at a point in time at which the on-state of the drive switch 321*a* and the on-state of the detection nozzle selection switch 321*s* are switched.

That is, in the second state, the predetermined potential Vx of the drive signal COMA is fed to the third node N3 along a path of the drive switch 321*a*→the first node N1→the detection nozzle selection switch 321*s*, and the predetermined potential Vx of the drive signal COMA is fed along a path of the second node N2→the first resistor 331. In the transition from the second state to the third state, the drive switch 321*a* transitions to the off-state, but the path of the second node N2→the first resistor 331 remains, and the predetermined potential Vx of the drive signal COMA is biased to the third node N3 by the first resistor 331. Thus, in the transition from the first state to the third state, since the potential of the third node N3 does not significantly change, the switching noise can be reduced. Moreover, the drive switch 321*a* and the detection nozzle selection switch 321*s* are controlled in a sequence of the first state→the second state→the third state, and thus, currents can continuously flow from the 1a-th piezoelectric device 311*a* and the 1b-th piezoelectric device 311*b*. As a result, the generation of a surge voltage at the time of switching such as a back electromotive force of a coil can be eliminated. As a result, the residual vibration can be detected simultaneously with the start of the period of state ST3.

In addition, in the transition from the second state to the first state, the detection nozzle selection switch 321*s* transitions to the off-state. However, even in the second state, since the drive signal COMA is applied to the 1a-th piezoelectric device 311*a* and the 1b-th piezoelectric device 311*b* via the drive switch 321*a* and the potential of the second node N2 becomes the predetermined potential Vx of the drive signal COMA, the noise superimposed on the voltage applied to the 1a-th piezoelectric device 311*a* and the 1b-th piezoelectric device 311*b* can be reduced.

In addition, in the periods of state ST1 and state ST5 which are the first states and in the periods of state ST2 and state ST4 which are the second states, since the detection switch 343 is turned on, the potential of the fourth node N4 is clamped to the analog ground AGND. As illustrated in FIGS. 11 to 13, there is a parasitic capacitance Ca between a feed line to which the drive signal COMA is fed and a feed line to which the third node N3 is coupled and the electromotive force based on the residual vibration is fed. Thus, even though the detection nozzle selection switch 321*s* is turned off in the period of state ST1, the inspection pulse P1 of the large amplitude is transmitted to the third node N3 via the parasitic capacitance Ca. According to the present embodiment, in the period of state ST1 and the period of state ST2, the detection switch 343 is turned on, and the fourth node N4 is clamped to the analog ground AGND. Thus, the inspection pulse P1 can be prevented from interfering with the residual vibration detector.

Figure 14:
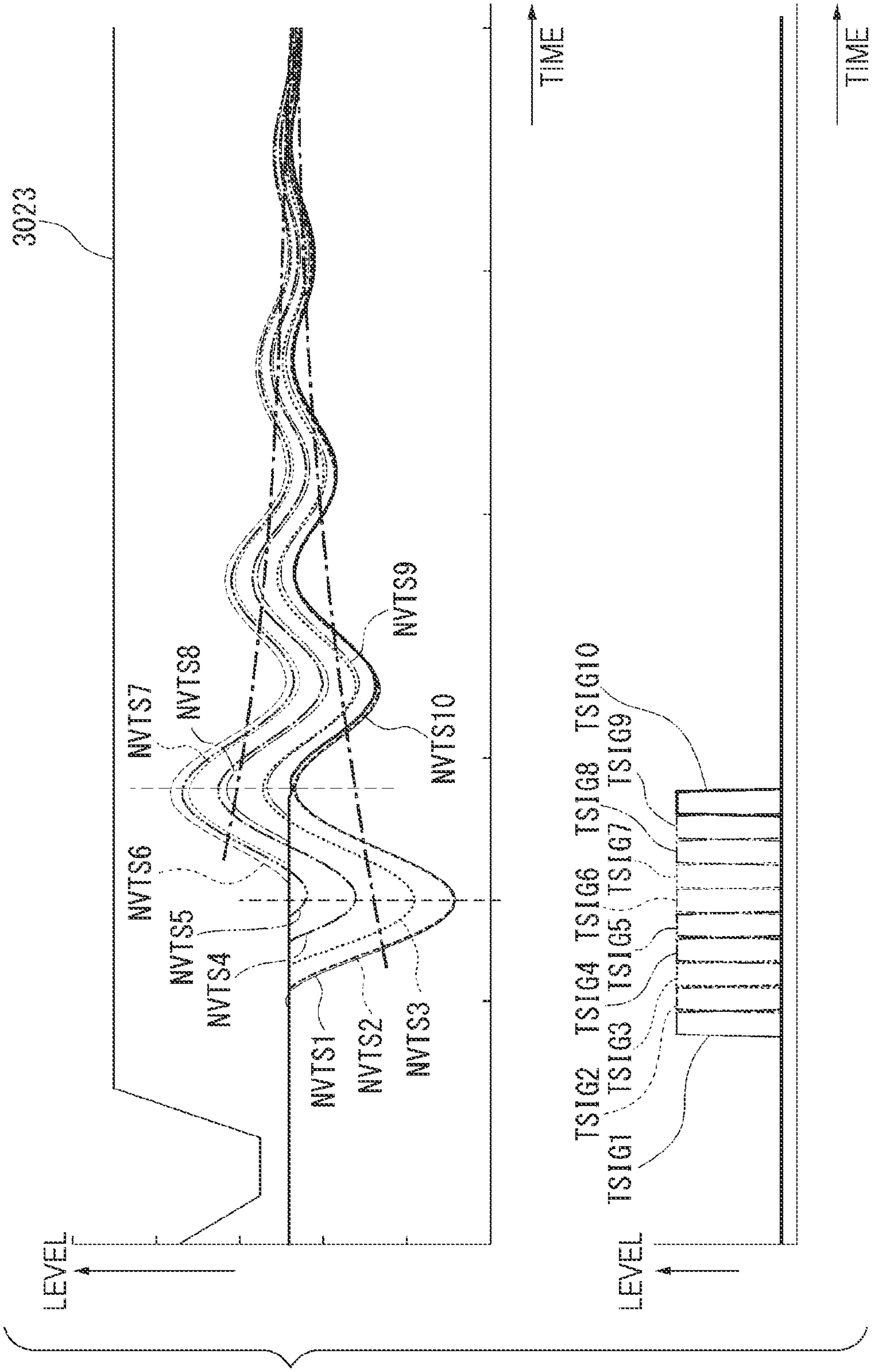
FIG. 14 is a diagram illustrating an example of correspondence between a timing of a signal and an output signal according to the embodiment.

FIG. 14 is a diagram illustrating an example of correspondence between a timing of the signal TSIG and an output signal NVTS according to the embodiment. In FIG. 14, a horizontal axis represents time and a vertical axis represents each voltage level. FIG. 14 illustrates the piezoelectric device drive signal 3023 at a single timing, ten signals TSIG1 to TSIG10 when ISIG internal signals are input at different timings, and ten output signals NVTS1 to NVTS10 generated by 10 signals TSIG1 to TSIG10.

Here, the piezoelectric device drive signal 3023 corresponds to a signal having the voltage of the drive signal COMA, the drive signal COMB, or the drive signal COMC in the example of FIG. 9. In addition, since pulse falling timings of the signal TSIG1 to the signal TSIG10 are different, switching timings from on to off of the drive switches 321*a*, 321*b*, and 321*c* of FIG. 9, and a switching timing from on to off of the detection switch 343 also change to the corresponding timings. In addition, the output signal NVTS1 to the output signal NVTS10 are signals corresponding to signals of the NVTS terminal outputs in the example of FIG. 9.

Hereinafter, changes in the signals of the NVTS terminal outputs which occur when the TSIG internal signals are input at different timings will be described. In general, the piezoelectric device is deformed when the voltage is applied by the drive signal or the like, and then the piezoelectric device has a property of returning to an original shape when the voltage application is stopped. It is known that mechanical damped vibration generated when the piezoelectric device returns to the original shape is a back electromotive force of the piezoelectric device. In the present embodiment, the back electromotive force that undergoes electrical damped vibration and is derived from the mechanical damped vibration when the deformed 1a-th piezoelectric device 311*a* and 1b-th piezoelectric device 311*b* return to the original shapes appears in the 1a-th electrode 312*a* and the 1b-th electrode 312*b*. When the drive switches 321*a*, 321*b*, and 321*c* are held in the on-state, since the potentials of the 1a-th electrode 312*a* and the 1b-th electrode 312*b* are fixed by the potential of the piezoelectric device drive signal 3023, the back electromotive force does not appear in the 1a-th electrode 312*a* and the 1b-th electrode 312*b*. On the other hand, when the drive switches 321*a*, 321*b*, and 321*c* are switched from on to off, since the potential fixing of the 1a-th electrode 312*a* and the 1b-th electrode 312*b* by the potential of the piezoelectric device drive signal 3023 is opened at this timing, the back electromotive force appears in the 1a-th electrode 312*a* and the 1b-th electrode 312*b* with the potential of the piezoelectric device drive signal 3023 as a starting point. Here, the back electromotive force passes through the high-pass filter 411 at the timing at which the detection switch 343 is switched from on to off, and is detected as the residual vibration signal at the NVTS terminal. Since the signal passes through the high-pass filter 411, a difference in DC offset is absorbed at a predetermined time constant, and the signal has a waveform similar to the output signal NVTS1 to the output signal NVTS10 as illustrated in FIG. 14. That is, as the amplitude of the back electromotive force input to the high-pass filter 411 at the timing at which the drive switches 321*a*, 321*b*, and 321*c* are switched from on to off increases, the influence of a transition response of the high-pass filter 411 increases, and the influence given to the waveform of the residual vibration signal appearing in the output signal NVTS becomes large.

Since the residual vibration signal damped-vibrates, the amplitude of the residual vibration signal which is a wave is detected at an early timing is also large, and a value of using an amplitude absolute value for the nozzle state determination is high. However, for the reason described above, the amplitude absolute value varies as the output signal NVTS1 to the output signal NVTS10 in FIG. 14 depending on the timing of the TSIG signal, and there is an increased concern that erroneous determination may be performed.

Figure 15:
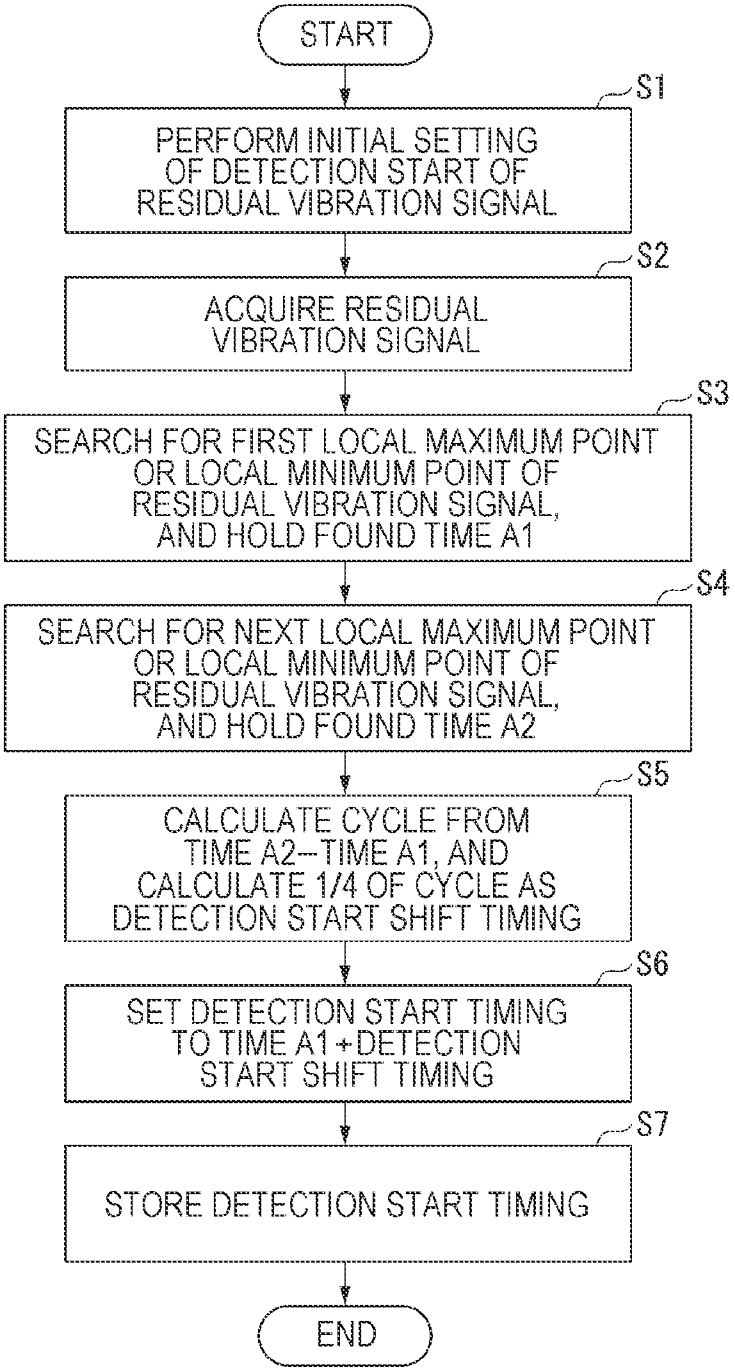
FIG. 15 is a diagram illustrating examples of a procedure of processes performed in a controller according to the embodiment.

FIG. 15 is a diagram illustrating examples of a procedure of processes performed in the first controller 2011 according to the embodiment. The processes in steps S1 to S7 will be described.

In step S1, the first controller 2011 performs initial setting of the detection start of the residual vibration signal. Then, the process proceeds to a process in step S2. Here, a timing at which the initial setting is performed may be any timing, and, for example, the early timing within an allowable range is used.

In step S2, the first controller 2011 detects the residual vibration signal by the function of the residual vibration detector, and acquires the residual vibration signal detected by the residual vibration signal detector. Then, the process proceeds to a process in step S3.

In step S3, the first controller 2011 searches for a first local maximum point of the residual vibration signal based on the acquired residual vibration signal, and holds a found time A1. Then, the process proceeds to a process in step S4.

In step S4, the first controller 2011 searches for a next local maximum point of the residual vibration signal based on the acquired residual vibration signal, and holds a found time A2. Then, the process proceeds to a process in step S5.

Here, in the process of step S4 and the process of step S5, although a case where the local maximum points of the residual vibration signal are used is described, as another example, local minimum points may be used instead of the local maximum points. For example, for the waveform of the residual vibration, a method of determining a cycle of the residual vibration based on one or more of a time between a local maximum point and a local maximum point adjacent to each other, a time between a local minimum point and a local minimum point adjacent to each other, or a time between a local maximum point and a subsequent adjacent local minimum point, or a time between a local minimum point and a subsequent adjacent local maximum point may be used.

In step S5, the first controller 2011 calculates the cycle of the residual vibration signal based on a value of the result obtained by subtracting the time A1 from the time A2, and calculates a value of ¼ times the cycle as a detection start shift timing. Then, the process proceeds to a process in step S6.

In step S6, the first controller 2011 sets the detection start timing to a value obtained by adding the detection start shift timing to the time A1. Then, the process proceeds to a process in step S7.

In step S7, the first controller 2011 stores the detection start timing in the storage. Then, the process in the present flow ends.

As described above, in the first head unit 301 according to the present embodiment, when a timing at which the residual vibration signal is taken out deviates, a level of the DC offset included in the detection result changes, and accordingly, control for turning off the driving of the piezoelectric device at a timing of a convergent point of the residual vibration waveform based on information on at least two points of the residual vibration signal is performed as a calibration process. For example, information on the local maximum point or the local minimum point is used as the information. As a result, in the first head unit 301 according to the present embodiment, the detection accuracy of the residual vibration signal can be enhanced.

As a configuration example, the first head unit 301 includes the ejection section W1 that ejects the liquid by the piezoelectric device that is displaced by the drive signal being fed, the residual vibration detector that detects the residual vibration signal generated by the residual vibration of the ejection section W1 caused by the displacement of the piezoelectric device, a first switch that switches whether or not to feed a first drive signal to the piezoelectric device, a second switch that switches whether or not to feed the residual vibration signal to the residual vibration detector, and the controller that controls the first switch and the second switch. The controller acquires the detection start timing based on an extreme point of the residual vibration signal detected by the residual vibration detector. The first switch is switched such that the first drive signal is not fed to the piezoelectric device at the detection start timing. The second switch is switched such that the residual vibration signal is fed to the residual vibration detector at the detection start timing.

In the examples of FIGS. 9, 10, and 15, the 1a-th piezoelectric device 311*a* and the 1b-th piezoelectric device 311*b* are examples of the piezoelectric device. In the examples of FIGS. 9, 10, and 15, the drive signal COMA, the drive signal COMB, and the drive signal COMC are examples of the first drive signal. In the examples of FIGS. 9, 10, and 15, the drive switch 321*a*, the drive switch 321*b*, and the drive switch 321*c* are examples of the first switch. In the example of FIGS. 9, 10, and 15, the detection switch 343 is an example of the second switch. In the examples in FIGS. 9, 10, and 15, the first controller 2011 is an example of the controller and is an example of the residual vibration detector. In the examples in FIGS. 9, 10, and 15, the local maximum point and the local minimum point are examples of the extreme point.

As a configuration example, the first head unit 301 includes the storage that stores the detection start timing acquired by the controller. Here, in the example illustrated in FIGS. 9, 10, and 15, the first storage 2112 is an example of the storage. Note that, such a storage may be provided outside the first head unit 301.

As a configuration example, in the first head unit 301, the residual vibration detector includes the peak hold circuit. Here, in the examples of FIGS. 9, 10, and 15, the peak hold circuit 362 is an example of the peak hold circuit, but the function of the peak hold circuit may be provided in the first controller 2011. In this case, the function of the peak hold circuit may be integrated with the function of the residual vibration detector. Note that, a configuration in which the residual vibration detector does not include the peak hold circuit may be used.

As a configuration example, the first head unit 301 includes the high-pass filter 411 in the previous stage of the residual vibration detector. Note that, the first head unit 301 may not include the high-pass filter 411.

As a configuration example, in the first head unit 301, the piezoelectric device is used for ejecting the liquid onto the medium.

As a configuration example, in the first head unit 301, the piezoelectric device is an inspection piezoelectric device that is not used for ejecting the liquid onto the medium.

As a configuration example, the liquid ejection device includes the transport mechanism L1 and the head unit.

As a configuration example, the control method in the first head unit 301, that is, the control as in the present embodiment is performed.

Figure 16:
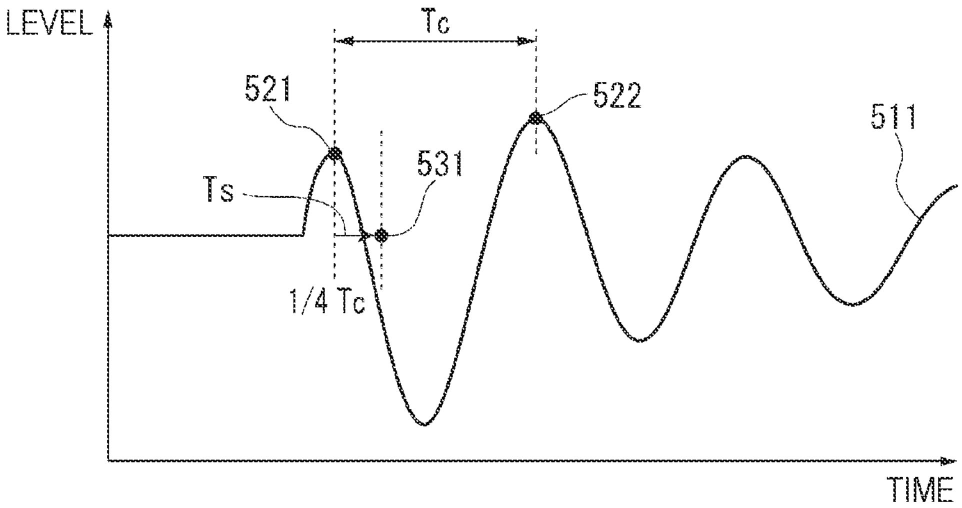
FIG. 16 is a diagram illustrating an example of determining a detection start timing of a residual vibration signal according to the embodiment.

A specific example of a process of determining the detection start timing will be described with reference to FIGS. 16 to 18. FIG. 16 is a diagram illustrating an example of determining the detection start timing of the residual vibration signal according to the embodiment. In FIG. 16, a horizontal axis represents time and a vertical axis represents a level. FIG. 16 illustrates a first residual vibration signal 511. In the first residual vibration signal 511, a difference time Tc which is a time between a first local maximum point 521 and an adjacent second local maximum point 522 is obtained. Then, a time that is ¼ times the difference time Tc is obtained as a first shift time Ts. A time obtained by adding the first shift time Ts to the first local maximum point 521 is set as a first detection start timing 531.

Figure 17:
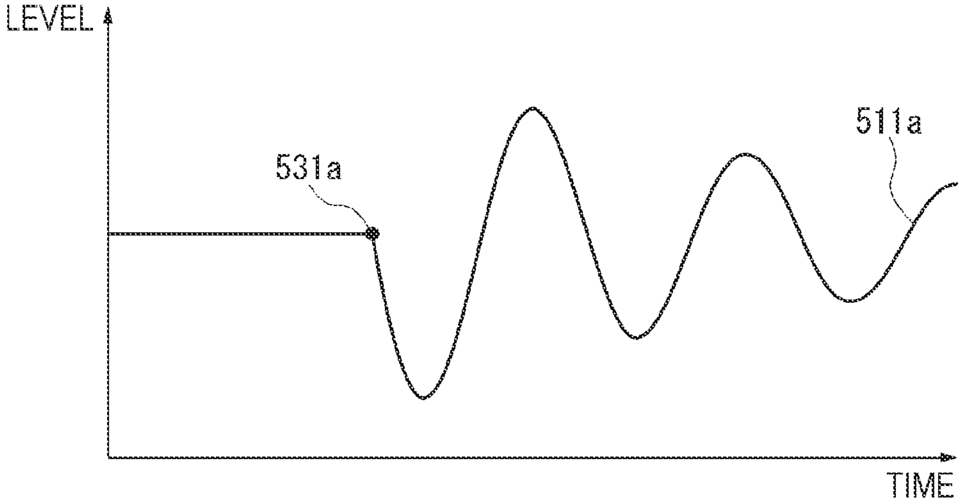
FIG. 17 is a diagram illustrating an example of the detection start timing of the residual vibration signal according to the embodiment.

FIG. 17 is a diagram illustrating an example of the detection start timing of the residual vibration signal according to the embodiment. In FIG. 17, a horizontal axis represents time and a vertical axis represents a level. FIG. 17 illustrates a 1a-th residual vibration signal 511*a* and a 1a-th detection start timing 531*a*.

Figure 18:
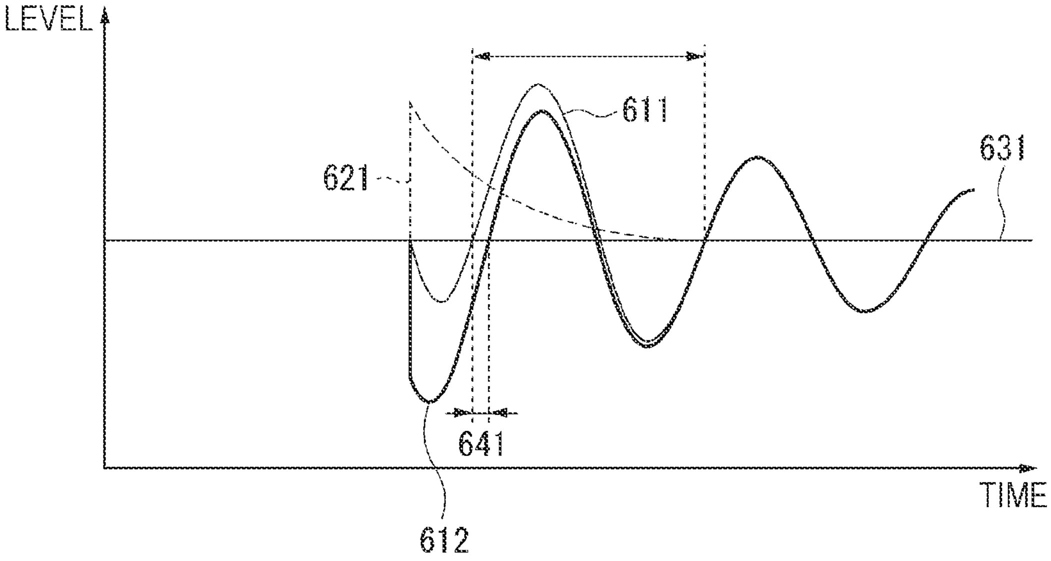
FIG. 18 is a diagram illustrating an example of an effect of adjusting the detection start timing of the residual vibration signal according to the embodiment.

FIG. 18 is a diagram illustrating an example of an effect of adjusting the detection start timing of the residual vibration signal according to the embodiment. In FIG. 18, a horizontal axis represents time and a vertical axis represents a level. FIG. 18 illustrates a residual vibration signal 611 with an offset, a residual vibration signal 612 without an offset, an offset 621, and a threshold 631. When time elapses, an offset component of the residual vibration signal 611 with an offset decreases, and when sufficient time elapses, the residual vibration signal 611 with an offset and the residual vibration signal 612 without an offset overlap each other.

An error 641 occurs in the result of the determination of binarization using the threshold 631 for the residual vibration signal 611 with offset and the result of determination of binarization using the threshold 631 for the residual vibration signal 612 without offset. By contrast, in the present embodiment, a problem of such an error can be eliminated by adjusting the detection start timing of the residual vibration signal.

Normally, when a waveform obtained by piezoelectric conversion of the residual vibration is analyzed, it is necessary to remove the noise, and the high-pass filter is used to reduce the DC component. However, when ejection-related information is analyzed from the waveform of the residual vibration, an operation is unstable for a first waveform due to the influence of the transition response of the high-pass filter, and the waveform is distorted. Thus, for example, the determination or the like is performed by using other second and subsequent waveforms by masking the first waveform.

By contrast, in the first head unit 301 according to the present embodiment, the waveform distortion due to the transition response of the high-pass filter 411 for removing the DC component is brought at the timing of the convergent point of the residual vibration waveform, and thus, the influence of the waveform distortion is reduced. Here, the convergent point of the residual vibration waveform is a point at which a level of fluctuation in a direction of the amplitude is ±0.

As the calibration process for this convergent point, the residual vibration is detected once, the cycle of the residual vibration is divided from the time difference between the maximum and the maximum, the driving of the piezoelectric device is turned off at the detection start timing of the residual vibration, and the residual vibration signal is fed to the residual vibration detector. As a result, in the present embodiment, the first waveform of the residual vibration can be used for analysis.

As described above, in the first head unit 301 according to the present embodiment, even when the high-pass filter 411 is provided in the previous stage of the residual vibration detector, the influence of the transition response of the high-pass filter 411 can be reduced, and the residual vibration waveform in which the waveform distortion due to the transition response of the high-pass filter 411 is reduced can be obtained. As a result, in the first head unit 301 according to the present embodiment, the first waveform of the residual vibration is not distorted, and the ejection-related information can be acquired with high accuracy.

An example of a process of optimizing a timing at which the sensing of the residual vibration signal is started for the residual vibration signal after the actuator is driven will be described as a specific example. For example, a circuit of an active bandpass filter (Act.BPF) using an operational amplifier may be used as a type of electric circuit that removes noise other than a main frequency component of the residual vibration signal. In this case, due to characteristics of the high-pass filter at an input stage of the circuit, the transition response occurs when a DC offset occurs in the input voltage.

In addition, a circuit that converts the residual vibration signal which is an analog quantity into a binary pulse by a comparator and measures a cycle and a phase of the residual vibration signal may be used as a circuit at the subsequent stage of the active bandpass filter. As a method for converting into the binary pulse, for example, a method for converting into one or a plurality of binary pulses by using one or a plurality of threshold voltages is used. In this case, the amplitude of the residual vibration signal is calculated by conversion based on pulse widths of the plurality of pulses on the assumption that the residual vibration signal is a sine wave attenuated, for example.

However, in such a configuration, a transition response component of the DC offset influences the accuracy of the cycle measurement. For example, when only information on the binary pulse by the comparator is used, even though a sensing timing at which the transition response component is minimized is calculated, accuracy for specifying times of the local maximum point and the local minimum point is insufficient, and the optimization accuracy of the detection start timing of the residual vibration signal becomes low.

By contrast, in the present embodiment, such a transition response component can be reduced, and can be ideally minimized. In the present embodiment, for example, information on the detection start timing of the residual vibration signal is stored for each ink jet head, and thus, errors in a cycle measurement and the like in the subsequent stage of the process of the residual vibration signal can be reduced.

Specifically, in the example illustrated in FIG. 16, the cycle of the residual vibration signal is a value close to the natural vibration of the piezoelectric device including a piezoelectric element. Then, as in the example of FIG. 17, a timing at which the switch for switching an application state of the drive signal to the piezoelectric device is turned off is adjusted to the timing of the convergent point of the residual vibration waveform.

Here, for example, a timing of a point advanced by ¼ of a cycle from the local maximum point of the waveform may be used as the timing of the convergent point of the residual vibration waveform. Note that, the local minimum point may be used instead of the local maximum point.

As described above, for example, the residual vibration signal passes through the active bandpass filter. Accordingly, even when distortion occurs in an original actuator electromotive signal due to the DC offset transition response at the sensing start timing of the residual vibration signal, in the present embodiment, the distortion can be reduced by adjusting the sensing start timing, and can be ideally minimized. As a result, in the present embodiment, the estimation of the nozzle state or the like can be performed by sensing the back electromotive signal due to the residual vibration after the PZT actuator is driven.

In the present embodiment, the influence of the DC offset transition response of the active bandpass filter is reduced, and thus, the component of the residual vibration signal caused by the original actuator driving can be detected. As a result, in the present embodiment, for example, as in the example of FIG. 18, when a cycle is obtained with an amplitude center level of the residual vibration signal as a threshold based on a time when the level of the residual vibration signal passes through the threshold, such as when the level of the residual vibration signal changes from a value smaller than the threshold to a value larger than the threshold or the level of the residual vibration signal changes from the value larger than the threshold to the value smaller than the threshold, the error can be reduced, and can be ideally reduced.

In addition, in the present embodiment, for example, since an extra transition response component with respect to the residual vibration signal can be sufficiently reduced from the initial stage of sensing, highly accurate amplitude measurement can be performed from the timing at which the amplitude is large in the initial stage of the attenuation waveform. For example, even when the amplitude of the residual vibration signal changes depending on the viscosity of the ejected liquid or other physical property values, in the present embodiment, highly accurate amplitude information can be used, and the accuracy of various determinations and the like can be improved.

For example, in a procedure of a shipment inspection for an ink jet head, a step of acquiring information on an optimum timing of sensing the residual vibration signal for each head and storing the information in a memory built in the head may be performed by the technique of the present embodiment. As a result, in a printer in which the head is incorporated, the information can be read from the memory, and the information can be used as the timing information for sensing at the time of sensing the residual vibration signal.

For example, in the printer in which the head is incorporated, a process of acquiring information on the optimum timing of the sensing of the residual vibration signal and storing the information on the timing as one of information associated with the head by the technique of the present embodiment before the determination of the nozzle omission or the like may be performed based on the sensing result of the residual vibration signal. As a result, in the printer, when nozzle omission or the like is actually determined, the information on the timing can be used as the timing information for sensing at the time of sensing the residual vibration signal.

For example, the sensing start timing of the residual vibration signal is optimized by the technique of the present embodiment, and thus, the amplitude of the first waveform among the attenuation waveforms can be acquired with high accuracy. As a result, the accuracy of detecting or determining the change in residual vibration caused by displacement characteristics of the actuator or deterioration over time can be enhanced, and the accuracy of detecting or determining a change in attenuation ratio of the residual vibration caused by a viscosity change of the ejected liquid can be enhanced.

Here, as the piezoelectric device used for detecting the residual vibration to determine the detection start timing and the piezoelectric device for which the residual vibration is detected by using the determined detection start timing, for example, the same piezoelectric device can be used, or different piezoelectric devices may be used. For example, in a configuration in which the piezoelectric device actually used for ejection is used for detecting the detection start timing, there is an effect that the number of parts of the head unit does not need to be increased. In another example, a configuration in which a piezoelectric device used for detecting the detection start timing is provided in addition to the piezoelectric device actually used for ejection may be used.

In addition, in the present embodiment, although the detection accuracy is enhanced by detecting the first waveform of the residual vibration and the accuracy of the information is enhanced by acquiring the ejection-related information based on the detection result when the residual vibration has a plurality of attenuated waveforms is described, in another example, a configuration in which the second and subsequent waveforms of the residual vibration are detected may be used. In addition, when the residual vibration has the plurality of attenuated waveforms, a configuration in which any two or more of the plurality of waveforms are detected may be used.

In addition, in the present embodiment, although a point at which ¼ cycle is deviated from the local maximum point or the local minimum point of the residual vibration is regarded as the convergent point of the residual vibration waveform and the detection start timing of the residual vibration is set, as another example, a cycle of the result of adding an integer multiple of 1 times or more of ½ cycle to ¼ cycle, such as ¾ cycle or 5/4 cycle, may be used instead of the ¼ cycle. In addition, an exact position of the converging point may not be necessarily used as the convergent point of the residual vibration waveform, and an error may be included. The error may be, for example, ⅛ of one cycle or ±45 degrees because one cycle corresponds to 360 degrees.

In the present embodiment, when there are the plurality of nozzles each using the piezoelectric device, for example, the detection of the detection start timing of the residual vibration and the control of the application of the detected detection start timing may be performed for each of the nozzles, and may be performed for each nozzle row including a predetermined number of nozzles. For example, the detection start timing may be detected for each of the plurality of nozzles, and an average value, a median value, or the like of the detection results may be applied to the plurality of nozzles. For example, the detection start timing may be detected for one or more representative nozzles, and the detection start timing based on the detection result may be applied to the other one or more nozzles. For example, a process of detecting the detection start timing may be performed a plurality of times for the same one or more nozzles, and the average value, the median value, or the like of the detection results of the plurality of times may be applied.

In the present embodiment, the process of detecting the detection start timing of the residual vibration may be performed at least once, but may be performed twice or more. For example, the head unit may perform a process of detecting and updating the detection start timing of the residual vibration whenever the nozzle is used. For example, the head unit may perform a process of detecting and updating the detection start timing of the residual vibration at every predetermined period. The predetermined period may be a regular period. For example, the head unit may perform a process of detecting and updating the detection start timing of the residual vibration when ink to be used, an air pressure, or the like at the time of use changes.

In the present embodiment, a process of detecting and storing the detection start timing of the residual vibration may be performed, for example, before shipment of the head unit, the liquid ejection device including the head unit, or the like, or may be performed after the shipment. For example, in the ink jet printer, the process of detecting and storing the detection start timing of the residual vibration may be performed at any timing after shipment.

A mode in which the process of detecting and storing the detection start timing of the residual vibration is performed may be provided in the head unit, the liquid ejection device including the head unit, or the like. The mode may also be referred to as a calibration mode or the like. In the head unit or the liquid ejection device including the head unit, for example, a process of the calibration mode may be performed at a timing at which a power supply is turned on or at a timing at which a reset is performed. In the head unit or the liquid ejection device including the head unit, switching between the calibration mode and a mode in which the detection start timing detected in the calibration mode is applied can be performed. The mode may also be referred to as, for example, a sensing mode.

A program for realizing a function of any constituent in the above-described any device may be recorded on a computer-readable recording medium, and a computer system may be caused to read and execute the program. The "computer system" mentioned here includes an operating system or hardware such as peripheral devices. The "computer-readable recording medium" refers to, for example, a portable medium such as a flexible disk, a magnetooptical disc, a read only memory (ROM), or a compact disc (CD)-ROM, or a storage device such as a hard disk built into the computer system. The "computer-readable recording medium" is assumed to include a memory that stores the program for a predetermined time, such as a volatile memory inside the computer system serving as a server or a client when the program is transmitted via a network such as the Internet or a communication line such as a telephone line. The volatile memory may be a RAM. The recording medium may be a non-transitory recording medium.

The program may be transmitted from the computer system that stores the program in the storage device or the like to another computer system via a transmission medium or a transmission wave in the transmission medium. The "transmission medium" for transmitting the program refers to a medium having a function of transmitting information, such as a network such as the Internet or a communication line such as a telephone line. The program may be a program for realizing a part of the functions described above. The program may be a so-called difference file, which can realize the above-mentioned function in combination with a program already recorded in the computer system. The difference file may be called a difference program.

The function of any constituent of the above-described any device may be realized by a processor. Each process in the embodiment may be realized by a processor that operates based on information such as a program and a computer-readable recording medium that stores information such as the program. In the processor, a function of each constituent may be realized by individual hardware, or the function of each constituent may be realized by integrated hardware. The processor includes hardware, and the hardware may include at least one of a circuit that processes a digital signal and a circuit that processes an analog signal. The processor may be configured by using one or both of one or a plurality of circuit devices mounted on a circuit board, and one or a plurality of circuit elements. An IC or the like may be used as the circuit device, and a resistor or a capacitor may be used as the circuit element.

The processor may be a CPU. However, the processor is not limited to the CPU, and various processors such as a graphics processing unit (GPU) or a digital signal processor (DSP) may be used. The processor may be a hardware circuit based on an application specific integrated circuit (ASIC). The processor may be configured with a plurality of CPUs, or may be configured with a hardware circuit including a plurality of ASICs. The processor may be configured with a combination of a plurality of CPUs and a hardware circuit including a plurality of ASICs. The processor may include one or more of amplifier circuits or filter circuits that process an analog signal.

Although the embodiment has been described in detail with reference to the drawings, a specific configuration is not limited to the present embodiment, and includes the design and the like within the scope without departing from the spirit of the present disclosure.

APPENDIX

Configuration Example 1

There is provided a head unit including an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch. The controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

Configuration Example 2

The head unit according to Configuration Example 1 further includes a storage that stores the detection start timing acquired by the controller.

Configuration Example 3

In the head unit according to Configuration Example 1 or Configuration Example 2, the residual vibration detector includes a peak hold circuit.

Configuration Example 4

In the head unit according to any one of Configuration Example 1 to Configuration Example 3, a high-pass filter is provided in a previous stage of the residual vibration detector.

Configuration Example 5

In the head unit according to any one of Configuration Example 1 to Configuration Example 4, the piezoelectric device is used for ejecting the liquid onto a medium.

Configuration Example 6

In the head unit according to any one of Configuration Example 1 to Configuration Example 4, the piezoelectric device is an inspection piezoelectric device not used for ejecting the liquid onto a medium.

Configuration Example 7

There is provided a liquid ejection device including a transport mechanism, and a head unit. The head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch, the controller acquires a detection start timing based on an extreme point of the residual vibration signal detected by the residual vibration detector, the first switch is switched such that the first drive signal is not fed to the piezoelectric device at the detection start timing, and the second switch is switched such that the residual vibration signal is fed to the residual vibration detector at the detection start timing.

Configuration Example 8

There is provided a control method in a head unit. The head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, a first switch that switches whether or not to feed a first drive signal to the piezoelectric device, a second switch that switches whether or not to feed the residual vibration signal to the residual vibration detector, and a controller that controls the first switch and the second switch. The control method includes acquiring, by the controller, a detection start timing based on an extreme point of the residual vibration signal detected by the residual vibration detector, switching the first switch such that the first drive signal is not fed to the piezoelectric device at the detection start timing, and switching the second switch such that the residual vibration signal is fed to the residual vibration detector at the detection start timing.

What is claimed is:

1. A head unit comprising:

an ejection section that ejects a liquid by a piezoelectric device displaced by a drive signal being fed;

a residual vibration detector that detects a residual vibration signal generated by residual vibration of the ejection section caused by the displacement of the piezoelectric device, the residual vibration detector including a peak hold circuit that detects extreme points of the residual vibration signal;

a first switch that switches whether or not to feed a first drive signal to the piezoelectric device;

a second switch that switches whether or not to feed the residual vibration signal to the residual vibration detector; and a controller that controls the first switch and the second switch, wherein the controller determines a detection start timing based on a time difference between adjacent local maximum points or adjacent local minimum points of the residual vibration signal among the extreme points of the residual vibration signal detected by the peak hold circuit of the residual vibration detector, the first switch is switched such that the first drive signal is not fed to the piezoelectric device at the detection start timing, and the second switch is switched such that the residual vibration signal is fed to the residual vibration detector at the detection start timing.

2. The head unit according to claim 1, further comprising:

a storage that stores the detection start timing acquired by the controller.

3. The head unit according to claim 1, wherein a high-pass filter is provided in a previous stage of the residual vibration detector.

4. The head unit according to claim 1, wherein the piezoelectric device is used for ejecting the liquid onto a medium.

5. The head unit according to claim 1, wherein the piezoelectric device is an inspection piezoelectric device not used for ejecting the liquid onto a medium.

6. A liquid ejection device comprising:

a transport mechanism; and a head unit, wherein the head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, the residual vibration detector including a peak hold circuit that detects extreme points of the residual vibration signal, a first switch that switches whether or not to feed a first drive signal to the piezoelectric device, a second switch that switches whether or not to feed the residual vibration signal to the residual vibration detector, and a controller that controls the first switch and the second switch, the controller determines a detection start timing based on a time difference between adjacent local maximum points or adjacent local minimum points of the residual vibration signal among the extreme point of the residual vibration signal detected by the peak hold circuit of the residual vibration detector, the first switch is switched such that the first drive signal is not fed to the piezoelectric device at the detection start timing, and the second switch is switched such that the residual vibration signal is fed to the residual vibration detector at the detection start timing.

7. A control method in a head unit, in which the head unit includes an ejection section that ejects a liquid by a piezoelectric device displaced by a drive signal being fed, a residual vibration detector that detects a residual vibration signal generated by residual vibration of the ejection section caused by the displacement of the piezoelectric device, the residual vibration detector including a peak hold circuit that detects extreme points of the residual vibration signal, a first switch that switches whether or not to feed a first drive signal to the piezoelectric device, a second switch that switches whether or not to feed the residual vibration signal to the residual vibration detector, and a controller that controls the first switch and the second switch, the control method comprising:

determining, by the controller, a detection start timing based on a time difference between adjacent local maximum points or adjacent local minimum points of the residual vibration signal among the extreme points of the residual vibration signal detected by the peak hold circuit of the residual vibration detector;

switching the first switch such that the first drive signal is not fed to the piezoelectric device at the detection start timing; and switching the second switch such that the residual vibration signal is fed to the residual vibration detector at the detection start timing.

* * * * *